United States Patent
Van Herpen

(10) Patent No.: US 8,564,207 B2
(45) Date of Patent: Oct. 22, 2013

(54) CARPET UNIT COMPRISING OPTICAL SENSOR

(75) Inventor: Maarten Marinus Johannes Wilhelmus Van Herpen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 252 days.

(21) Appl. No.: 13/147,445

(22) PCT Filed: Feb. 3, 2010

(86) PCT No.: PCT/IB2010/050463
§ 371 (c)(1),
(2), (4) Date: Aug. 2, 2011

(87) PCT Pub. No.: WO2010/092507
PCT Pub. Date: Aug. 19, 2010

(65) Prior Publication Data
US 2011/0285296 A1  Nov. 24, 2011

(30) Foreign Application Priority Data

Feb. 10, 2009 (EP) .................................. 09152472
May 20, 2009 (EP) .................................. 09160772

(51) Int. Cl.
*H05B 37/02* (2006.01)
*H01J 40/14* (2006.01)

(52) U.S. Cl.
USPC ......................................... 315/159; 250/216

(58) Field of Classification Search
None
See application file for complete search history.

(56) References Cited

U.S. PATENT DOCUMENTS

| 4,794,373 | A | 12/1988 | Harrison |
| 5,567,932 | A | 10/1996 | Staller et al. |
| 2007/0037462 | A1 | 2/2007 | Allen et al. |

FOREIGN PATENT DOCUMENTS

| EP | 0261811 A2 | 3/1988 |
| EP | 0323682 A | 7/1989 |
| GB | 1345412 | 1/1974 |
| JP | 62144087 A | 6/1987 |
| WO | 2007033980 A2 | 3/2007 |

OTHER PUBLICATIONS

CRC Handbook of Chemistry and Physics, 69th Edition, 1988-1989, pp. E-208 and E-406.

*Primary Examiner* — Crystal L Hammond
(74) *Attorney, Agent, or Firm* — Yuliya Mathis

(57) ABSTRACT

The invention provides a carpet unit comprising a laminate of a tufted primary backing layer providing a carpet unit top face, an intermediate adhesive layer, and a backing layer providing a carpet unit back face, wherein the carpet unit is selected from the group consisting a carpet and a carpet tile, wherein the carpet unit further comprises an optical sensor, arranged to generate a sensor signal, wherein, seen from carpet unit top face, the optical sensor is arranged behind the primary backing layer, and wherein the carpet unit is arranged to transmit light from the carpet unit top face to the optical sensor.

11 Claims, 8 Drawing Sheets

CARPET UNIT COMPRISING OPTICAL SENSOR

FIELD OF THE INVENTION

The invention relates to a carpet unit for optical applications, and to a lighting arrangement comprising the carpet unit. The invention further relates to the use of such carpet unit and lighting arrangement for specific purposes.

BACKGROUND OF THE INVENTION

Lighting on or in floors is known in the art. EP0323682 for instance describes an apparatus for guiding the occupants of a building along a path of travel within the building which comprises modular carpet tiles which are arranged to cover the floor of the structure, with some of the tiles being signal units having a light-transmissive, molded plastics housing positioned in an opening therein, and having light-emitting diodes positioned in the housing. The light-emitting diodes are energized via an electrical cable, and thereby provide a visually discernable pathway on the floor.

US20070037462 describes a method for manufacturing a distributed optical fibers scrim comprising functional optical fibers, the functional optical fibers scrim thus manufactured, and composites in which an optical fibers scrim is incorporated.

U.S. Pat. No. 4,794,373 describes an apparatus for visually guiding the occupants of a structure in a path of travel along the floor within the structure is provided. This apparatus is comprised of a carpet overlying the floor, and a lighting strip positioned underneath the carpet. The lighting strip comprises an elongate ribbon, with a group of laterally spaced-apart electrical conductors encased in and extending longitudinally of the ribbon of sheet material. A series of light-transmissive plastic housings are connected to and arranged longitudinally along a common outer surface of the ribbon of plastic sheet material. Light-emitting means are positioned within each of the housings, and are electrically connected to predetermined ones of the group of electrical conductors encased in the ribbon of sheet material. The carpet has holes extending therethrough which are arranged in a series corresponding to the series of light-transmissive housings on the lighting strip.

SUMMARY OF THE INVENTION

A problem associated with carpets having optical fibers integrated in the carpet may be that the optical fibers may be damaged due to use of the carpet and/or due to rolling up the carpet. Hence, when optical sensing through a carpet is desired, the use of fiber that sticks through the carpet may be less desired. Further, the presence of such optical fibers may have an undesired influence of the appearance of the carpet and/or on the flexibility of the carpet. However, there is a desire to use optical senses in carpets. The problem is how to integrate an optical sensor in a carpet; preferably, the optical sensor should not be visible to the outside.

Hence, it is an aspect of the invention to provide an alternative carpet unit, such as a carpet tile, or a plurality of carpet tiles, or a carpet, that preferably further at least partly obviates the above-mentioned problem(s).

The solution proposed here is to embed the optical sensors in carpet. In a preferred embodiment, the optical sensor is placed behind the carpet and the carpet is made light transmissive through the application of especially a translucent carpet adhesive layer within the carpet unit.

Hence, according to a first aspect, the invention provides a carpet unit comprising a laminate of a tufted primary backing layer providing a carpet unit top face, an intermediate adhesive layer, and a backing layer providing a carpet unit back face, wherein the carpet unit is selected from the group consisting a carpet and a carpet tile, wherein the carpet unit further comprises an optical sensor, arranged to generate a sensor signal, wherein, seen from carpet unit top face, the optical sensor is arranged behind the primary backing layer, and wherein the carpet unit is arranged to transmit light from the carpet unit top face to the optical sensor. An advantage may be that the optical sensor may not be visible by a user: the user may observe the carpet unit top face but will not observe the optical sensor which is behind the primary backing layer. A further advantage may be that the optical sensor is protected, since at least the primary backing, but optionally also the adhesive layer, or even the backing layer may be between the user and the optical sensor.

Another advantage is that the sensor (and/or the light source) does not need to be cleaned, because it is hidden in or behind a carpet unit, of which substantially only the carpet unit top face is cleaned in the normal cleaning process of the carpet unit. Would the sensor and/or light source penetrate through the whole carpet unit, or extend from primary backing layer between the tufts, the sensor and/or light source might be damaged or become dirty during a (normal) cleaning procedure.

In an embodiment, the optical sensor is, seen from carpet unit top face, behind the carpet unit back face. This may provide maximum protection. In an embodiment, one or more optical sensors may be integrated in a lighting unit or a plurality of lighting units (see also below). In another embodiment, the optical sensor is embedded in one or more of the intermediate adhesive layer and the backing layer. Of course, the carpet unit may comprise a plurality of optical sensors.

In yet a further embodiment, the adhesive layer comprises a light transmissive latex adhesive or a light transmissive acrylic adhesive.

The carpet unit may be provided together with a control unit. The control unit may be configured to receive one or more input signals and is configured to generate, in response to the one or more input signals, one or more output signals to control other items. For instance, the control unit may be arranged to control, in response to the output signal one or more items selected from the group consisting of a light source, a plurality of light sources (see also below), audio equipment, video equipment, a temperature controller, a climate control, an alarm unit, an automatic electric door, etc., but especially at least one or more light sources, even more preferably one or more light sources of the carpet back lighting system. Hence, in a further aspect, the invention provides a combination of a carpet unit and a control unit. The control unit in such embodiments, but also in other embodiments described herein, may be part of the carpet unit, but may also be arranged external from the carpet unit.

The carpet unit may be provided in combination with a light source and a control unit. Hence, the invention provides in a further aspect a lighting arrangement comprising a light source arranged to generate light, a control unit and the carpet unit according to any one of the preceding claims, wherein the control unit is configured to receive one or more input signals and is configured to generate, in response to the one or more input signals, one or more output signals to control the light generated by the light sources, and wherein at least one input signal is received from a sensor, especially an optical sensor (such as for instance indicated above). This (optical) sensor may be arranged in the carpet unit, behind the carpet unit, or may be arranged external from the carpet unit. In a specific embodiment, the sensor is an optical sensor arranged within or behind the carpet unit. Note that this light source may be arranged external from the carpet unit, somewhere in a room wherein the carpet unit is arranged, but may also be arranged behind the carpet unit front face. Also combinations of such embodiments may of course be applied. Especially, in an embodiment the light source is part of a carpet back lighting system.

Hence, in an embodiment, the carpet back lighting system may be used as display, which may be arranged to generate lighting through the carpet unit, such as to provide information to a person using the carpet unit.

In a specific embodiment, the optical sensor is arranged to sense people and generate a corresponding sensor signal. For instance, in another embodiment, the optical sensor is arranged to sense an encoded light signal and generate a corresponding sensor signal. In another embodiment, the optical sensor is arranged to sense an encoded light signal and generate a corresponding sensor signal. This may be an advantage, because it may not be straightforward how to send information to a light source located behind a carpet, such as in a back lighting system (see also below). Since the carpet is (at least partly) light transmissive, the use of coded light becomes a possibility. The optical sensor senses the signal and a (micro) control unit may in response to the sensor signal control the light source behind the carpet. In return, the light source below the carpet may return an information signal in coded light. This may for example be used to setup a network of lighting units that are located below a carpet surface. Hence, in a specific aspect, the invention provides a back lighting system comprising a plurality of back lighting units, wherein each back lighting unit comprises a light source, a control unit (such as a micro control unit), and a optical sensor, wherein the back lighting units are arranged to send and receive signals by light from a back lighting unit to one or more other back lighting units, wherein the signals by light may in an embodiment be coded light.

In a further aspect, the control unit (of the lighting arrangement) is arranged to derive from the sensor signal the position of a person, and is arranged to control, in dependence of the position of said person, the light generated by the light source to be in the form of a lighting pattern indicative of a direction for the person. In yet a further embodiment, the control unit (of the lighting arrangement) is further arranged to derive from the sensor signal a direction of movement of a person, and is arranged to control, in dependence of the direction of movement of said person, the light generated by the light source. The direction for the person may for instance be the direction chosen at the controllable input device.

In yet a further aspect, the invention provides specific uses of the carpet unit and of the lighting system, such as a use for anti-stumble lighting (wherein further the optical sensor is arranged to sense the presence or a movement of a person). Further, the carpet unit, especially in combination with a light source, or the lighting arrangement, may be used as one or more selected from the group consisting of a personalized in-building navigation system, a dating carpet unit, a carpet unit for showing lighted foot traces, a carpet unit responsive to sound, a carpet unit for showing the presence of a person or item on that carpet unit, a retail wayfinding carpet unit, a seat finder carpet unit, an advertisement carpet unit, a dynamic cue carpet unit, a game carpet unit, emergency exit indicator carpet unit, and a weight scale carpet unit.

The term "optical sensor" is known in the art and relates to a device that is able to detect light. In a specific embodiment, the sensor is arranged to sense visible light. The term sensor herein especially relates to optical sensors, but may in specific embodiments also relate to other types of sensors. Where the sensor is arranged to sense light, the term sensor refers to an optical sensor; such sensor is especially arranged to sense visible light. As will be clear to the person skilled in the art, a plurality of sensors may be applied.

The invention is, amongst others, based on the use of a carpet unit in combination with light. Light may be transmitted through at least part of the carpet to provide light to a user at the front face of the carpet unit, but, alternatively or in addition, light above the carpet may also be transmitted through at least part of the carpet unit, to be detected by an optical sensor ((integrated in or behind the carpet unit).

The carpet unit may especially be arranged to allow light escape from the carpet unit front face, especially from behind the primary backing layer, while the light source(s) is (are) not visible through the tufts. Hence, advantageously, the light source(s) may not be visible. Thus, the term "light transmissive carpet unit" may not imply a carpet with a hole through which a light source may be visible or through which the light source penetrates. As mentioned below, the light source(s) will not be visible by eye for an observer looking at the carpet unit front face, since at least the yarns and the primary backing layer do not allow so. Therefore, the primary backing layer and tufts, and optionally also other layers (in embodiments wherein the light source is arranged behind such optional layers, respectively) may be light transmissive for the light of the light source(s).

The invention in some embodiments may preferably use the fact that the yarns forming tufts of the carpet unit form a structure having enough openings to transmit light, even though the textile appears to be opaque to human eyes. For appearance reason, the tufts are preferably provided in such a way that the primary backing layer is not visible, but the light can still penetrate through the tuft structure. Placing a light source or other parts (such as a sensor) of a lighting system behind the primary backing layer which is permeable to light results in that the light from the light source is emitted from the tufted surface. Herein, the term "tufted primary backing layer" relates to a primary backing layer comprising tufts.

The carpet unit may in an embodiment be combined with a carpet back lighting system, but alternatively or additionally, also light sources may be embedded in the carpet unit. The combination of a carpet unit and a carpet back lighting system is herein also indicated as "carpet structure".

In an embodiment, the invention provides a carpet back lighting system comprising a carpet back lighting unit having a lighting unit front face and a unit back face, suitable as back lighting at a carpet unit back side of a light transmissive carpet unit selected from the group consisting a light transmissive carpet and a light transmissive carpet tile, wherein the lighting unit front face comprises a light source, arranged to generate light, and an anti-slip coating. Preferably, the carpet back lighting system comprises a plurality of light sources. Advantageously, the carpet back lighting system may so provide the anti-slip function which might otherwise be partly lost due to the presence of the back lighting system.

In an embodiment, the unit back face also comprises an anti-slip coating. The anti-slip coating(s) may comprise a tackifier. Further, the anti-slip coating(s) may (further) comprise a rust inhibitor.

In yet another embodiment, a carpet back lighting system is provided, comprising a carpet back lighting unit having a lighting unit front face and a unit back face, suitable as back lighting at a carpet unit back side of a light transmissive carpet unit selected from the group consisting a carpet and a carpet tile, wherein the lighting unit front face comprises a light source, arranged to generate light, and accompanying optics, wherein the optics are suitable to be arranged to guide light into the light transmissive carpet unit, and wherein the optics are suitable to be arranged to penetrate into at least part of the light transmissive carpet unit. Advantageously, the path length the light has to travel is shorter, and thereby, less light may be lost. Further, the optics may contribute to keeping the carpet unit at its place. The backing of the carpet unit, such as a secondary backing of a carpet or the tile backing of a tile may have a relatively low transmission. By penetrating at least part of the backing, this problem may at least partially be circumvented.

In an embodiment, the lighting unit front face comprises a substrate recess, wherein one or more of the light source and accompanying electronics may be arranged in the substrate recess. In a specific embodiment, the carpet back lighting system comprises a substrate, preferably a printed circuit board (PCB), comprising the light source. Such substrate may have a maximum height of at maximum 1 mm, and wherein the lighting unit, including optional optics, has a total maximum height of at maximum 3 mm. Especially, the total height is at maximum 1.5 mm, such as 1 mm or smaller, like 0.2-1.5 mm.

The carpet back lighting system may further comprise a control unit configured to receive one or more input signals and configured to generate, in response to the one or more input signals, one or more output signals to control the light of the light source.

Especially, the invention also provides a carpet structure comprising an arrangement of a carpet back lighting system and a light transmissive carpet unit as defined herein, wherein the lighting system comprises a one or more lighting units, wherein the lighting unit front faces of the one or more lighting units and the carpet unit back side of the light transmissive carpet unit are adjacent, and wherein the light transmissive carpet unit is arranged to transmit at least part of the light travelling in a direction from the carpet unit back side to the carpet unit front face. This may result in that the light from the light source is emitted from the tufted surface.

In yet another embodiment, a carpet structure is provided comprising an arrangement of a carpet back lighting system and a light transmissive carpet unit as defined herein, wherein the lighting system comprises a one or more lighting units, wherein the lighting unit front faces of the one or more lighting units and the carpet unit back side of the light transmissive carpet unit are adjacent, wherein the optics penetrate at least part of the carpet unit, and wherein the light transmissive carpet unit is arranged to transmit at least part of the light travelling in a direction from the carpet unit back side to the carpet unit front face. Preferably, the light transmissive carpet unit comprises a pre-shaped recess arranged to at least partly accommodate the plurality of optics. Hence, in an aspect, the invention also provides a light transmissive carpet tile comprising one or more recesses, arranged to at least partly accommodate one or more optics of a lighting unit of a carpet back lighting system The above mentioned optics may comprise one or more materials selected from the group consisting of organic and inorganic transmissive materials. Preferably, the optics has a pointed top face. The optics may in an embodiment comprise a structure having a shape selected from the group consisting of conical, pyramidal, cylindrical and cuboidal. In a preferred embodiment, the optics comprises an electrically conductive element, such as a wire, arranged at least part of an external face of the optics. When applying the carpet unit to the back lighting system, in the conductive wire also a current may be generated to heat the electrically conductive wire, preferably to a temperature in the range of 50-200° C. In this way, part of a tile backing may melt, thereby making it easier to penetrate the backing, accommodating at least part of the optics.

In yet another embodiment, which may be combined with one or more of the above embodiments, the carpet unit may be combined with an optical sensor, which is arranged to receive light through at least part of the carpet unit According to a further aspect, the invention provides a lighting arrangement comprising a carpet structure, such as defined herein, and a control unit, wherein the carpet structure comprises a carpet back lighting system comprising a carpet back lighting unit having a lighting unit front face and a unit back face, wherein the lighting unit front face comprises a light source arranged to generate light, and wherein the carpet back lighting system comprises a plurality of said light sources, and a light transmissive carpet unit comprising a carpet unit front face and a carpet unit back side, wherein the light transmissive carpet unit is selected from the group consisting a carpet and a carpet tile, wherein the lighting unit front face of the carpet back lighting unit and the carpet unit back side of the light transmissive carpet unit are adjacent, and wherein the light transmissive carpet unit is arranged to transmit at least part of the light travelling in a direction from the carpet unit back side to the carpet unit front face and wherein the control unit is configured to receive one or more input signals and is configured to generate, in response to the one or more input signals, one or more output signals to control the light generated by the light sources. Such lighting arrangement can fulfill all kind of functions, see also below.

In a specific embodiment, the lighting arrangement may further comprise a user controllable input device for inputting a direction for one or more people, and wherein the control unit is further arranged to control, in response to the inputted direction, the light generated by the light sources to be in the form of a lighting pattern indicative of a direction for the one or more people. In yet another embodiment, the lighting arrangement may further comprise a sensor arranged to generate a sensor signal, and wherein the control unit is further arranged to control, in response to the sensor signal, the light generated by the light sources. In a specific embodiment, the control unit is arranged to derive from the sensor signal the position of a person, and is arranged to control, in dependence of the position of said person, the light generated by the light sources to be in the form of a lighting pattern indicative of a direction for the person. Especially, the control unit may further be arranged to derive from the sensor signal a direction of movement of a person, and is arranged to control, in dependence of the direction of movement of said person, the light generated by the light sources. In an embodiment, the sensor is a pressure sensor.

In an embodiment, the lighting arrangement further comprises one or more of a sensor, arranged to generate a sensor signal, and a user input device, arranged to generate a user input device signal, wherein the control unit is arranged to control, in response to one or more of the sensor signal and the user input device signal, the light of the light source.

According to a further aspect, the invention also provides a method of providing information to a person by displaying a lighting pattern in a light transmissive carpet unit with the lighting arrangement. For instance, the information comprises navigation information for the person. In a specific embodiment, the lighting arrangement further comprises a sensor arranged to generate a sensor signal, the person comprises a tag that can be sensed by the sensor, and control unit is arranged to control the navigation information in dependence of the sensor signal. The information provided may (also) comprise one or more of a trademark, a company name, a logo, an advertisement.

The lighting arrangement may be used, as one or more selected from the group consisting of a personalized in-building navigation system, a dating carpet unit, a carpet unit for showing lighted foot traces, a carpet unit responsive to sound, a carpet unit for showing the presence of a person or item on that carpet unit, a retail wayfinding carpet unit, a seat finder carpet unit, an advertisement carpet unit, a dynamic cue carpet unit, a game carpet unit, emergency exit indicator carpet unit, a weight scale carpet unit, and an anti-stumble carpet.

Especially, also a carpeted floor (herein also indicated as "carpet structure") is provided comprising (a) a (back) lighting system comprising a plurality of light sources (arranged on a floor) and (b) a plurality of light transmissive multi-layer carpet units arranged on the back lighting system. Such carpeted floor may thus be used to provide (carpet) light, i.e. light emanating from the carpet tiles (when one or more the light source(s) of the lighting system are switched on). The advantage of a back lighting system is that the light source(s) are not embedded within the carpet unit, improving the flexibility of designing the light effect (no standardized carpet+lighting products needed), and also improving the possibilities for changing or replacing the back lighting system in future. Especially, such carpet structure floor may in an embodiment also be used to provide information with light, i.e. especially create a lighting pattern on the floor. Such carpet structure or carpeted floor may be part of a lighting arrangement (see also above). According to yet a further aspect, the invention provides a method for providing a carpeted floor comprising arranging a back lighting system on a floor, optionally integrated in a padding or placed on a padding, and arranging a (broadloom) carpet or a plurality of carpet tiles over the lighting system.

Further, a control unit may be provided, which may be arranged external from the carpet unit but which may also be integrated in the carpet unit, arranged to control the (individual or a plurality of) light sources. In this way, also information may be provided, like arrows indicating in a specific direction, commercial information. One or more of color, on/off state, intensity, pattern shape and information content of the carpet light (i.e. light generated by the light source(s) embedded in or behind the carpet unit) may be variable and may be controlled by the control unit. Further, one or more of color, on/off state, intensity, pattern shape and information content of the light may be dependent on a sensor signal of a sensor (such as a touch or approach/presence sensor, or a fire detector), for example wherein the sensor is arranged to sense an object on or in the vicinity of the carpet unit, and wherein the control unit is arranged to control or more of color, on/off state, intensity, pattern shape and information content of the light in dependence of the sensor signal. Therefore, in yet another embodiment, the carpet unit further comprises a sensor, such as a touch or an approach sensor, which may be arranged external from the carpet unit but which may also be integrated in the carpet unit.

In yet a further embodiment, the invention provides the carpet unit in combination with a sensor and the control unit, wherein the sensor is arranged to provide a sensor signal when the sensor is approached or touched, and wherein the control unit is arranged to control one or more parameters selected from the group consisting of a lighting parameter (such as one or more of color, color distribution, light intensity, light intensity distribution, blinking frequency, etc.) of the light sources, pattern shape of the light of the plurality of light sources, and information content provided by the light of the plurality of light sources. Patterns or information will in general be provided by a plurality of light sources.

The term "light source" may also refer to a plurality of light sources, such as a plurality of LEDs. Hence, the light source may refer a plurality of light sources. In a specific embodiment, the term "LED" may also refer to a plurality of LEDs. The term "plurality of LEDs" may refer to 2 or more LEDs, especially 2-100,000 LEDs, for instance 2-10,000, like 4-300, such as 16-256. Hence, the carpet tile or the lighting system may comprise a plurality of LEDs. In general, the carpet unit may comprise 2-40,000 LEDs/$m^2$, especially 25-10,000 LEDs/$m^2$. The light source may comprise any light source, such as a small incandescent lamp or a fiber tip or fiber irregularity (arranged to let light escape from the fiber, which embodiment has the advantage that it is relatively cheap), but may especially comprise a LED (light emitting diode) (as light source). A specific advantage of using LEDs is that they are relatively small and may thereby fit better within the carpet unit (recess) or below. As mentioned before, a total thickness of the lighting system below 1 mm is preferred, and this may only be achieved with LEDs. The term LED may refer to OLEDs, but especially refers to solid state lighting. Unless indicated otherwise, the term LED herein further refers to solid state LEDs. Especially, the light source is part of a lighting system comprising a plurality of light sources. Such lighting system may be integrated in a carpet padding or underfloor.

In a preferred embodiment, the light source comprises one or more LEDs. According to a further embodiment, wherein a plurality of LEDs as light sources is applied, the LEDs are Red-Green-Blue (RGB) LEDs. For example, a portion of the LEDs is red LEDs, another portion is green LEDs and yet another portion is blue LEDs. The use of RGB LEDs is advantageous because it allows the color of the carpet to be changed. For example when white tufts are used in combination with RGB LEDs, it is possible to change the color of the carpet into any desired color. For example, by setting the RGB LEDs to the color green, the tufts of the carpet will look green. However, also other color combinations, like blue and yellow, or blue, yellow and red, can be used, as well as a plurality of three or more colors may be used. Also, the carpet does not necessarily need to be white. For example, the carpet top face may be brown, or gray, or even black. This is not possible with technologies such as projectors or beamers, which always require a white surface to generate all colors.

The terms "blue light" or "blue emission" especially relate to light having a wavelength in the range of about 410-490 nm. The term "green light" especially relates to light having a wavelength in the range of about 500-570 nm. The term "red light" especially relates to light having a wavelength in the range of about 590-650 nm. The term "yellow light" especially relates to light having a wavelength in the range of about 560-590 nm. The term "light" herein especially relates to visible light, i.e. light having a wavelength selected from the range of about 380-780 nm. Light emanating from the carpet, i.e. from the carpet tile top face, into a space over the carpet is herein also indicated as "carpet light". The term "white light" herein, is known to the person skilled in the art. It especially relates to light having a correlated color temperature (CCT) between about 2000 and 20000 K, especially 2700-20000 K, for general lighting especially in the range of about 2700 K and 6500 K, and especially within about 15 SDCM (standard deviation of color matching) from the BBL, especially within about 10 SDCM from the BBL, even more especially within about 5 SDCM from the BBL.

The terms "transmissive", "permeable for light", "permeable to light" or "light permeable" relates to the light transmitted by a material, such as a layer. Herein, the term "transmitted" or "transmission" relate to undisturbed transmission (substantially no scattering in the material) and/or disturbed transmission (after scattering, like in translucent materials). Hence, the terms "permeable for light" or "light permeable" may also herein be indicated as "transmission". The transmission or permeability can be determined by providing light at a specific wavelength with a first intensity to the material and relating the intensity of the integrated light at that wavelength measured after transmission through the material, to the first intensity of the light provided at that specific wavelength to the material (see also E-208 and E-406 of the CRC Handbook of Chemistry and Physics, $69^{th}$ edition, 1088-1989). Note that even a low transmission may for this application be allowable, especially when using high-power LEDs. In general, the permeability for light, such as of the primary backing layer, of the secondary backing layer and of the adhesive layer, i.e. is especially determined in relation to visible light travelling in the direction to the carpet top layer. In general, transmission will be measured transversal to the carpet unit, i.e. light impinging substantially perpendicular to the carpet unit top face or carpet unit back side is used to measure the transmission of that light through (at least part of) the carpet unit.

Preferably, the light transmissivity of the carpet unit between the carpet unit top face an a light source or an optical sensor or other parts of such light source or optical sensor (which light source or optical sensor be embedded in the carpet unit, preferably behind a primary backing, or even arranged behind the whole carpet unit (such as at the carpet unit back side)), is in the range of about 0.5-30%, preferably 0.5-15%, such as in the range 0.5-10% (measured under perpendicular irradiation with visible light, see also below). Preferably, the transmission is larger than about 1%, such as at least 5%. Preferably, the transmission of through the entire carpet unit is in the range of about 0.5-30%, preferably 0.5-15%, such as in the range 0.5-10% (measured under perpendicular irradiation with visible light, see also below). Preferably, the transmission is larger than about 1%, such as at least 5%.

Unless indicated otherwise, and where applicable and technically feasible, the phrase "selected from the group consisting" a number of elements may also refer to a combination of two or more of the enumerated elements.

Terms like "below", "above", "top", and "bottom" relate to positions or arrangements of items which would be obtained when the carpet or carpet tiles are arranged substantially flat on a substantially horizontal surface with the carpet tile bottom face on such surface or on a surface substantially parallel to the substantially horizontal surface. However, this does not exclude the use of the carpet tiles in other arrangements, such as against a wall, or in other (vertical) arrangements.

The term "behind" in "behind the carpet unit front face" or "behind the front face", etc. in general indicates parts in the carpet unit, seen from the user side, i.e. seen from the front side, which are located behind (or below) the carpet unit front face. It may also indicate parts behind the carpet unit, i.e. behind the carpet unit back side. The term "adjacent" is known in the art, and especially means nearby, such as for instance within a distance of 0-10 mm. In a specific embodiment, the term "adjacent" refers to physical contact. In embodiments wherein the carpet unit back side and back lighting unit front face are adjacent, it especially indicates that at least part of the carpet unit and at least part of the back lighting unit have physical contact.

As mentioned above, the carpet unit may be a carpet or a carpet tile (including a plurality of carpet tiles). Here, in some more detail tufted carpets are described. This part describes amongst others light sources embedded in the carpet laminate. However, in a preferred embodiment the light source is arranged completely behind the carpet laminate (i.e. behind the carpet unit back side.

Carpets generally comprise a primary backing layer provided with yarns forming tufts (on its side facing the user during its use as carpet), a secondary backing layer, and in general an adhesive layer provided between the primary backing layer and the secondary backing layer. The yarns penetrate the primary backing layer to form tufts projecting from the pile surface on which people can walk, etc. The yarns are normally loose and need to be adhered with adhesive (from an adhesive layer). The adhesive layer which may be present on the backside of the primary backing adheres the tufts to the primary backing layer and holds the tufts in place, as well as adhering the primary backing layer and the secondary backing layer. The latter may also be achieved with a second adhesive layer on top of the first adhesive layer.

Advantageously, the carpet light is generated behind the surface of the carpet (herein also indicated as front face), more precisely, behind the primary backing layer, thereby allowing protection of the light source(s) (and/or optical sensors) and allowing a substantial homogenous lighting.

The term carpet herein refers to tufted carpets, but in an embodiment also to tufted rugs and in another embodiment also to tufted goblins. In yet another embodiment, the term carpet refers to tufted car mats. Examples are also tufted carpets that are used as wall or roof covering, or tufted bath mats. Herein, the light emitting tufted carpet is further also indicated as "carpet" or "tufted carpet".

The primary backing layer and secondary backing layer may be laminated to each other by means known in the art. Therefore, the carpet may be a laminate, herein also indicated as "carpet laminate" or simply "laminate". Preferably, an adhesive layer is applied to attach the primary layer and secondary layer to each other. Hence, in an embodiment, the light emitting tufted carpet further comprises an adhesive layer having an adhesive layer top face and an adhesive layer bottom face, arranged between the primary backing layer and the secondary backing layer, wherein the adhesive layer is preferably at least partially permeable for the carpet light.

The invention provides in an embodiment a tufted carpet comprising a laminate, wherein the laminate comprises the primary backing layer, the adhesive layer, optionally the light source and/or optical sensor, and the secondary backing layer. Hence, in this embodiment, at least part of the primary backing layer bottom face of the primary backing layer is in contact with at least part of the adhesive layer top face of the adhesive layer, and at least part of the adhesive layer bottom face (opposite of the adhesive layer top face) of the adhesive layer is in contact with at least part of the secondary backing layer top face. In this way, the laminate is provided, here being a "stack" of the primary backing layer, the adhesive layer and the secondary backing layer.

The laminate has a top layer ("carpet top layer"), which is the primary backing layer carpet face. This layer comprises the tufts. Further the laminate has a carpet bottom layer. This carpet bottom layer may in an embodiment be the secondary backing layer bottom face. In one embodiment, the carpet does not comprise a secondary backing at all, but only a primary backing layer is provided.

However, the laminate may further optionally comprise more layers than the above indicated primary backing layer, optional adhesive layer, and optional secondary backing layer. Such optional layer(s) may be arranged between the primary backing layer and the adhesive layer, between the primary backing layer and the secondary backing layer (in embodiments wherein the adhesive layer is not present), between the adhesive layer, secondary backing layer or below the secondary backing layer, etc. Examples of such additional optional layer may be the below indicated scattering layer and reflective layer. More than one optional further layer may be present in the carpet laminate.

The term "primary backing layer" may include a primary backing layer comprising a plurality of layers. Likewise, the term "secondary backing layer" may include a secondary backing layer comprising a plurality of layers. Especially, the yarns forming tufts of the carpet form a structure having enough openings to transmit light, even though the carpet appears to be opaque to human eyes. For appearance reason, the tufts are preferably provided in such a way that the primary backing layer is substantially not visible, but the light can still penetrate through the tuft structure. Placing a source of light behind a primary backing layer which is permeable to light results in that the light from the source of light is emitted from the tufted surface. Such a tufted carpet has the advantage that it has less size restriction of the light emitting part. For instance, at the location of the light emission, the primary backing has not to be removed.

According to a further embodiment of the invention, the primary backing layer is permeable to light. As used in this description, the terms 'permeable to light' or 'light permeable' mean that all or part of the visible light is permitted to pass through the material, with or without being diffused. This has the advantage that the decrease of the intensity of the light emitted from the light source(s) by the primary backing layer is reduced. For example, more than 0.5%, such as 1%, or more than 5%, or more than 10%, or more than 30% of light intensity from the light source reaching a first side of the primary backing layermay be transmitted through the primary backing layer (see also below).

The term "part of the visible light is permitted to pass" may indicate that all visible light is partly transmitted (i.e. less than 100% is transmitted) but may alternatively or additionally also indicate that some parts of the visible light spectrum is (partly) transmitted and other parts are substantially not transmitted. Layers, especially the adhesive layer (if permeable to light) may be more permeable to some parts of the visible spectrum than to other parts of the visible spectrum, as is known to the person skilled in the art.

According to a further embodiment of the invention, the primary backing layer has apertures which are covered by the tufts. The apertures may increase the intensity of the emitted ("transmitted") light. The freedom of the choice of material for the primary backing layer is now high, because there is no restriction that the primary backing layer material has to be permeable to light. For example a woven textile may be used as primary backing layer. This will have apertures between the yarns in the woven structure.

As used in this description, the term 'secondary backing layer' includes the backing layer which forms the surface of the carpet opposite from the pile surface. Such a layer is usually referred as a 'secondary backing layer' and is commercially available. These 'secondary backing layers' have an advantage in that they are well suited for carpet backing and fit in well with the carpet manufacturing method used in carpet factories. Advantages of using the secondary backing layer may be protection of the optional light source(s) as well as providing strength to the carpet. Hence, preferably the tufted carpet according to the invention comprises the secondary backing layer. The invention is however not restricted to the presence of the secondary backing layer, and further and/or other layers may be present, such as on the side of the secondary backing layer facing away from the adhesive layer (i.e. between the secondary backing layer bottom face and the carpet bottom layer), but also elsewhere (see also above).

According to a further embodiment of the invention, at least one of the primary backing layer and the secondary backing layer comprise polypropylene, nylon or jute. These materials have the advantage that they are of relatively low cost. It is easy to manufacture a light permeable structure with polypropylene or nylon. Also, the fact that these materials are commonly used in existing tufted carpets makes the carpet according to the invention easy to manufacture. It is noted that these backing layers may substantially consist of the above materials.

According to a further embodiment of the invention the secondary backing layer has an air permeability of at least about 70 m$^3$/min/m$^2$. Air permeability of the secondary backing layer can be determined according to ASTM D-737, with a pressure differential equal to 0.5 inch (1.27 cm) water. An acceptable value is 250 ft$^3$/min/ft$^2$ (76.2 m$^3$/min/m$^2$), but more preferred values are in the range of 350-800 ft$^3$/min/ft$^2$ (106.7-243.8 m$^3$/min/m$^2$). Secondary backing layers with an air permeability of below about 70 ft$^3$/min/ft$^2$ (24.4 m$^3$/min/m$^2$) are considered to be inadequate for high binder cure rates.

According to a further embodiment of the invention, the carpet has a delamination strength of at least 44.6 kg/m between the primary backing layer and the secondary backing layer. This requirement is sometimes also indicated as "peel strength" and is normally tested according to ASTM D-3936.

The primary backing layer has a primary backing layer carpet face being the carpet top layer (sometimes also indicated as "pile surface") and a primary backing layer bottom face; the optional secondary backing layer has a secondary backing layer top face and a secondary backing layer bottom face. The primary backing layer has a primary backing area and the (optional) secondary backing layer has a secondary backing area, which areas are in general substantially the same and in general substantially the same as the carpet area.

According to a further embodiment of the invention, the secondary backing layer has apertures for air passage. Vaporized binders used for the adhesive layer can pass through the apertures during curing of the carpet. With this embodiment, it may be ensured that the air permeability of the secondary backing layer is sufficiently high.

Further, with respect to the secondary backing layer, in an embodiment this secondary backing layer may be based upon an existing product for the secondary backing layer, such as the one known under the name ActionBac®. This is a backing made of a leno weave of slit film and spun olefin yarns. It has a 2.1 ounce per square yard (0.71 gram per 15 square meter) fabric with polypropylene warp tapes and polypropylene multifilament picks in a leno wave with averages of 16 warps per inch (per 2.54 cm) and 5 picks per inch (per 2.54 cm). Such a backing layer imparts dimensional stability with good delamination strength in carpets. This backing layer also has openness well suited for robust curing rates during manufacture. The air permeability of this backing, determined according to ASTM D-737 with a pressure differential equal to 0.5 inch water, exceeds about 750 ft$^3$/min/ft$^2$ (229 m$^3$/min/m$^2$), which is ample for robust binder cure rates. Another such product with a higher count, 18×13, leno wave construction, has average air permeability above about 720 ft$^3$/min/ft$^2$ (219 m$^3$/min/m$^2$). This is also well suited for efficient cure rates. Preferably, the secondary backing layer 20 has a high adhesive compatibility with the material used for the adhesive layer 50, so that the carpet 100 will pass delamination test such as the test described in ASTM D-3936. The delamination resistance-imparting properties should preferably be such that the backing when laminated in the reference carpets described has a delamination strength of at least 2.5 pounds/in (44.6 kg/m). However, preferred values are greater than 3-4 pounds/in (53.6-71.4 kg/m), more preferably at least 5.5 pounds/in (98.2 kg/m) and even more preferably at least 6 pounds/in (107.1 kg/m). To prevent delamination good bonding is required. Bonding may be improved by having sufficient openness not to impede passage of vaporized binders liquids from the carpet during curing.

Air permeability of the secondary backing can be determined according to ASTM standard D-737, with a pressure differential equal to 0.5 inch water (see also above). An acceptable value is 250 $ft^3/min/ft^2$, but more preferred values are in the range of 350-800 $ft^3/min/ft^2$. As an example, secondary backings with below about 70 $ft^3/min/ft^2$ are considered to be inadequate for high binder cure rates. As an example, ActionBac® is a very suitable secondary backing and exceeds 750 $ft^3/min/ft^2$.

In an embodiment, the light source is arranged, when seen from the carpet unit front face, behind the carpet unit back side. Such light source may be part of a backlighting system and/or may be attached to the carpet unit back side. Light sources separate from the carpet unit provide the advantage that the light source may be replaced, without the need of replacing part or the entire carpet unit. Especially in embodiments wherein the carpet unit is a (broadloom) carpet, this may be advantageous, because it is more complex to produce a broadloom carpet with embedded LEDs. It is also advantageous when using carpet tiles, because carpet tiles are generally not glued to the floor and are therefore easy to replace. The carpet unit may simply be (partly) removed, the light source replaced and the carpet unit can be positioned at (substantially) its original position. When a plurality of light sources, the light sources may be arrange according to one or more of the herein described embodiments. Placing the light source behind the carpet unit also allows the user to replace the carpet without the need to replace the lighting system.

As will be mentioned later, in some embodiments the light source(s) may be embedded within the adhesive layer of the carpet.

According to a further embodiment of the invention, the light source(s), such as LEDs, is (are) integrated in the secondary backing layer, wherein the secondary backing layer is permeable to light for allowing transmission of the light from the light source to the adhesive layer, or the light source is provided on the secondary backing layer top face. These two arrangements of the light source(s) and the secondary backing layer may ensure that the light from the light source reaches the adhesive layer, to be further transmitted to the primary backing layer top face of the carpet. The advantage of this approach is that the light source(s) (are) protected within the laminate structure of the carpet. The light source(s), such as LED(s), may be protected against e.g. abrasion or impact, which could damage e.g. the electronics or damage a watertight seal around the electronics. On the pile surface side, the light source(s) are protected by the primary backing with tufts, and on the opposite side the LEDs are protected by the secondary backing. Protection of the backside is especially important during installation of the carpet. Hence, it is thus also advantageous to use the current invention in a light permeable secondary backing of carpet. The reason for this is that for high quality carpet a certain air permeability of the secondary backing is required to achieve high delamination strength.

In some embodiments, part of the secondary backing may be covered with optics, electronics and light source(s). If the base secondary backing has a sufficiently high air permeability this is acceptable. For example, if 50% of the surface is covered, the air permeability is in the worst case reduced to 50% of the normal air permeability. In order to achieve an acceptable air permeability of 250 $ft^3/min/ft^2$, one should therefore use a secondary backing with an air permeability of greater than 500 $ft^3/min/ft^2$. As an example, ActionBac® has an air permeability of greater than 700 $ft^3/min/ft^2$ and therefore may be used for the current invention. It should be noted that any other existing secondary backing material may be used as basis for the secondary backing layer 20 used in this invention. Other examples are needlefelt backings, rubber backings, PVC backings, polyurethane backings, vinyl backings, cushion backings, nylon backings. The fibers in the needlefelt backings are needled for bonding. It is also noted that a cushion or padding may be integrated in the secondary backing. Another example of a secondary backing material is bitumen. This material is used when extra sturdy carpet is required, such as for example in carpet tiles, or in car mats. In some embodiments bitumen may also be used as adhesive. As mentioned above, preferably such secondary backing layer is comprised in the tufted carpet 100 according to the invention.

The adhesive layer comprises an adhesive layer top face, directed to the primary backing layer and an adhesive layer bottom face directed to the secondary backing layer. Again, the term "adhesive layer" may in an embodiment include an adhesive layer comprising a plurality of adhesive layers (such as a pre-coat layer and adhesive layer) and may in another embodiment include an adhesive layer comprising a plurality (such as a mixture) of adhesives. For instance, the adhesive layer may be present on the backside of the primary backing and adhering the tufts to the primary backing layer and holding the tufts in place as well as adhering the primary backing layer and the secondary backing layer to each other (with for instance the light source(s) within the adhesive layer). Or a first adhesive layer may be present on the backside of the primary backing and adheres the tufts to the primary backing layer and holds the tufts in place, and a second adhesive layer, on top of the first adhesive layer, for adhering the primary backing layer and the secondary backing layer (with for instance the light source(s) within the second adhesive layer). Such adhesive layers, though optionally also being based on different adhesives, are herein indicated as adhesive layer.

Especially in those embodiments wherein a light source is at least partially arranged in the adhesive layer, and even more especially in those embodiments wherein a light source is not in physical contact with the primary backing layer, but is at least partially covered by the adhesive layer or behind the adhesive layer, it is preferred that the adhesive layer is permeable for carpet light, i.e. (the light escaping from the optical fiber to the exterior of the carpet). Hence, in an embodiment, the adhesive layer is permeable for carpet light. Therefore, the adhesive layer holding the tufts in place may in an embodiment be used to hold the light source in place under the primary backing layer. The light source may be positioned between the primary backing layer bottom face of the primary backing layer and the adhesive layer top face of the adhesive layer. Opening(s) may be provided in the surface of the adhesive layer top face directed to the primary backing layer, in which the light source can be placed.

According to a preferred embodiment of the invention, the adhesive layer is at least partially permeable to light for allowing transmission of the light from the light source to the primary backing layer. This allows that the light source may be arranged below the adhesive layer top face. In this case, the light source may optionally be fixed in place with an additional adhesive means. The light source may also be fully encapsulated in the adhesive layer.

Alternatively, the light source may be positioned under the adhesive layer.

According to a further embodiment of the invention the adhesive layer comprises light scattering particles, which are also referred as fillers. Fillers have the advantage of reducing the cost of the carpet, while bulking up the adhesive at the same time. They may also be needed to comply with fire retarding requirements. Because the fillers scatter light, this results in that the light from the carpet appears to originate from an area larger than the original emission spot. It is advantageous when a homogeneous light emission is desired. The light scattering particles may be calcium carbonate, or other materials, such as TiO2. The advantage of calcium carbonate is that it is of relatively low cost. Calcium carbonate may be in the form of calcite or chalk. The light scattering particles may also be kaolinite such as china clay fillers. Typically the fillers are used in quantities such as for example 600 g/l, but for many embodiments of the current invention it is preferred that much lower amounts are used in order to increase the light permeability.

In contrast to the previously mentioned useful properties of fillers, in order to make the adhesive and particularly the pre-coat layer light transmissive it should preferably be substantially free from light scattering or light absorbing particles. If this is not possible (for example due to fire retarding properties of these particles, or because it generates desired light effects as mentioned above), the amount of filler should preferably be reduced as much as possible. Alternatively, the filler should preferably be replaced with another filler that does not scatter light or scatters light less than state of the art fillers as $CaCO_3$. This may be achieved for example by choosing a filler that has a similar optical index of refraction compared to the adhesive material. For example, we have found that $Al(OH)_3$ has a relatively low scattering in combination with latex. We have also found that the use of fillers with a high degree of purity (for example ≥99%) improves the light transmittance (for example, the $CaCO_3$ fillers typically used in carpeting are known to be brownish in color, due to impurities in the $CaCO_3$).

According to a further embodiment of the invention, the adhesive layer comprises electrically conductive particles. The electrically conductive particles may give the carpet antistatic properties. The electrically conductive particles may be e.g. carbon black, potassium formate (HCOOK), tin-oxide, indium-tin-oxide or silver. According to a further embodiment of the invention, the adhesive layer comprises anti-oxidants. The anti-oxidants make the adhesive layer more resistant to heat. This is advantageous because light source(s) such as LEDs can generate a substantial amount of heat. Also, latex without anti-oxidants may age faster and become yellow after some time, due to which it starts to absorb light, such as possibly the light from the light source(s).

According to a further embodiment of the invention, the adhesive layer comprises latex. The latex may be light permeable latex. It is noted that the adhesive layer may substantially consist of latex. The latex may be based on terpolymers of styrene, butadiene and an acidic vinyl monomer. When the adhesive layer substantially consists of light permeable latex and comprise substantially no light scattering particles, the light from the light source(s) can leave the carpet efficiently. Thus, preferably no light scattering fillers are used in the adhesive and the adhesive layer is light permeable. Therefore, in an embodiment, the adhesive layer is free from light scattering particles. The phrase "is free from . . . " and similar phrase or terms especially indicate that something "is substantially free from . . . ". As mentioned before, it may not be possible to eliminate all light scattering particles due to for example fire retardance requirements, but the amount of light scattering particles should be as low as possible.

According to a further embodiment of the invention, the adhesive layer comprises acrylics. The acrylics may be light permeable acrylics. It is noted that the adhesive layer may substantially consist of acrylics. An example of acrylics is polyacrylate ester. Advantages of acrylics are hardness, flexibility and resistance against UV. Acrylics are also highly resistant to heat, which makes it an especially suitable material for use in combination with light source(s) such as LEDs, which generate a relatively large amount of heat. Latex and acrylics may also be used in combination.

In a preferred embodiment a polyolefin dispersion is used as pre-coat (on for instance the primary layer for subsequent providing the adhesive layer) and/or the adhesive layer itself. A suitable polyolefin dispersion may for instance be HYPOD™ of Dow Chemical. These are propylene- and ethylene-based dispersions that combine the performance of high-molecular-weight thermoplastics and elastomers with the application advantages of a high-solids waterborne dispersion. Polyolefin dispersions can provide benefits to carpet manufacturers by allowing them to apply a thermoplastic backing using conventional coating equipment. For example, using a carpet backing of PVB (poly vinyl butyral), or polypropylene, the problem of UV sensitivity is solved, while at the same time increasing the UV-light permeability. Hence, another suitable polyolefin dispersion may be a PVB-based dispersion. However, other thermoplastics might have an even higher light permeability. In some embodiments, the adhesive layer is permeable to light and may comprise the light source(s).

According to a further embodiment of the invention, the tufted carpet further comprises a reflecting layer positioned to a side of the light source(s) facing away from the primary backing layer. The reflecting layer can direct light to the pile surface and increases the intensity of the light emitted from the tufted carpet. For instance, a reflective layer may be arranged between the light source(s) and the carpet bottom layer. Alternatively, between the secondary backing layer bottom face and the carpet bottom layer a reflective layer may be arranged. Assuming the light source(s) being arranged substantially within the adhesive layer, between the adhesive layer and the secondary backing layer, a reflective layer may be arranged. Such reflective layer is not necessarily an integral layer, but may also consists of parts, for instance in view of adhesive properties. The carpet bottom layer may also be a reflective layer itself. Reflection may be specular or diffuse. Hence, the reflective layer may also be a scattering layer. Hence, the optional adhesive layer, the optional reflective layer or the optional scattering layer may be an integral layer, substantially having the same length and width dimensions as the primary backing layer, but may also consist of parts. For instance, good adhesion between the primary and secondary backing layer may also be achieved wherein there are "layer domains" i.e. parts of the primary and secondary backing layers are adhered to each other by the adhesive layer, and parts are laminated to each other without the adhesive layer in between. The person skilled in the art may optimize the dimensions of the optional adhesive layer, the optional reflective layer or the optional scattering layer in order to obtain the desired results.

As mentioned above, the carpet unit may be a carpet or a carpet tile (including a plurality of carpet tiles). Here, in some more detail tufted carpet tiles are described.

There is a desire to provide carpets with lighting functions, but there is also a desire to be flexible when arranging the carpet and the lighting on a floor. The latter is herein provided by using carpet tiles. Additionally, the advantage of carpet tiles is that they do not necessarily need to be glued to the floor, which makes it possible to replace or repair a lighting system that is installed below the carpet tile(s). However, it is not excluded that the carpet tile(s) is glued to for instance a floor or another structure, such as a padding, arranged to for instance such floor.

The carpet tile may be a light transmissive multi-layer carpet tile (further also indicated as "carpet tile" or "tile") having a carpet tile top face ("pile") and a carpet tile bottom face, the multi-layer carpet tile comprising: a tufted primary backing layer comprising the carpet tile top face and a primary backing layer bottom face; a pre-coat layer, attached to the primary backing layer bottom face; and a tile backing, attached to the pre-coat layer, wherein the tile backing comprises the carpet tile bottom face.

Preferably, the multi-layer carpet tile comprises a light transmissive carpet tile section having a carpet tile light transmission in the range of preferably 0.5-30%, preferably 0.5-15%, and further preferably at least 1%, such as at least 2%, or at least 5%, for light propagating in a direction from the tile backing to the carpet tile top face and having a wavelength in the visible range. In this way, a robust carpet may be provided, based on state of the art carpet producing processes, but with special attention to the transmissivity when choosing the respective layers and/or layer materials. The multi-layer carpet structure is preferred in order to comply with the requirements for carpet tiles compared with normal carpets.

The term 'tile backing' is a special type of backing. The term 'secondary backing' may refer to a 'tile backing', but not every secondary backing is suitable as 'tile backing' For example, the previously described 'ActionBak' may not be suitable as a 'tile backing'

The pre-coat layer may be needed to comply with requirements for especially tuft bind strength and preferably fire retardance, and the tile backing may be required to comply with requirements in for example total mass per unit area, total squareness and straightness of edges, dimensional stability, curling/doming and damage at cut edge (fraying). Especially for applications with a high degree of wear (for instance offices, schools, hotels, libraries, hospitals, transport vehicles, certain rooms in homes, etc.,) this may be worthwhile. Further, the use of tiles may be advantageous, since in case a light source may need to be replaced, repaired or removed, only the relevant carpet tile(s) may have to be removed (temporarily).

The indicated transmission range may on the one hand provide enough transmission through the carpet tile, for instance to make the light effect even visible under typical office lighting conditions, especially assuming state of the art LEDs, preferably solid state LEDs, but on the other hand, may substantially prevent visibility of elements (such as for example the light source) under the carpet tile (or other elements under the carpet tile). Visibility of the floor or other elements under the carpet tiles may especially not be desired, because the light source (or other elements, like electric wires, reflective foil, a padding) may no longer be hidden.

Solid state LEDs as light source(s) are especially desired because of their small dimensions. Such light sources with state of the art technique may be less than 1 mm thick, even in the range of about 0.2 mm (excluding a support structure of 0.5-1 mm thickness, such as PCB (printed circuit board), or smaller. When arranging such light source (for example having a total thickness of 1 mm including support structure) on a floor, the carpet tile may be arranged over the light source without substantial influence of the (presence of the) light source on the (local) surface height of the carpet tile and without substantial influence on the (local) touch of the carpet tile. Nevertheless, it may be preferred to take into account the presence of a light source under the carpet tile when producing carpet tiles. Therefore, in an embodiment, the tile backing comprises a recess arranged to be able to at least partially enclose a light source.

However, preferably instead, the tile backing material may also be chosen such that it can (plastically) deform to shape itself over the light source(s) (and/or lighting system, see also below). This may be the case for most of the materials proposed in this application.

Hence, when applying light sources, the carpet tiles may have no recesses and the carpet tiles are arranged over the light sources (or over the lighting system, respectively), or the carpet tiles may have recesses, and the recesses of the carpet tiles are arranged over the light sources, or the light sources, more especially the lighting system, may be comprised by a padding and the carpet tiles are arranged over the padding. In a further embodiment, the light transmissive multi-layer carpet tiles do not comprise recesses. In yet another embodiment, the lighting system is comprised in a padding.

The light source may be separate from the carpet, i.e. the carpet tile may in an embodiment not include a light source. However, in a specific embodiment, the light source may also be at least partially integrated in the carpet, especially in the tile backing. Therefore, in an embodiment the carpet tile may comprise at least one light source. Thus, the invention provides in a specific embodiment the light transmissive multi-layer carpet tile comprising the light source, preferably a (solid state) light emitting diode (LED).

In a preferred embodiment, the primary backing layer comprises tufts comprising light reflective material. For example, the primary backing is a nonwoven material through which light brown yarns are tufted, the tufted primary backing having a light transmittance of for example 1-2% without pre-coat layer applied. The use of (reflective) tufts may further enable light outcoupling from the carpet and/or improve light distribution and/or reduce light absorption. The reflectivity may for instance be in the range of 10-40%.

The choice of the materials of the respective layers of the multi layer may further be of relevance for the transmission of the light source light through the carpet tile. In an example, the primary backing layer comprises a material selected from the group consisting of polypropylene (PP), nylon, and jute, especially PP. Further, preferably the pre-coat layer comprises a material selected from the group consisting of a light transmissive latex, a light-transmissive acrylic and light transmissive polyolefin dispersion based material (such as Hypod™ from DOW). In order to make the pre-coat or adhesive light transmissive it should preferably be substantially free from light scattering or light absorbing particles. If this is not possible (for example due to fire retarding properties of these particles), the amount of filler should preferably be reduced as much as possible. Alternatively, the filler should preferably be replaced with another filler that does not scatter light or scatters light less than state of the art fillers as $CaCO_3$. This may be achieved for example by choosing a filler that has a similar optical index of refraction compared to the adhesive material. For example, we have found that $Al(OH)_3$ has a relatively low scattering in combination with latex. We have also found that the use of fillers with a high degree of purity (for example ≥99%) improves the light transmittance (for example, the $CaCO_3$ fillers typically used in carpeting are known to be brownish in color, due to impurities in the $CaCO_3$).

The vast majority of carpet tiles that are currently produced are using bitumen or an opaque poly(vinyl chloride) layer as tile backing. These tile backings have no light transmittance and thus another material should be used. Therefore, in a further embodiment, the tile backing comprises a material selected from the group consisting of transmissive poly(vinyl chloride) (PVC) or poly(vinyl butyral) (PVB), silicone rubber, or poly(methyl methacrylate) (PMMA), but alternatively a backing based on polypropylene (PP) or polyethylene (PE) may also be used. All these materials can be used as secondary backing having some flexibility and some light transmittance. Thus, any of these light transmissive materials PVC, PVB, silicone rubber, PMMA, etc, may be applied.

The tile backing also comprises an adhesive, coated to the pre-coat layer. This adhesive layer may optionally comprise the above mentioned scrim. Preferably, the adhesive layer used for the tile backing comprises a material selected from the group consisting of transmissive PVC (poly vinyl chloride), PVB (poly vinyl butyral), silicone rubber, PMMA, PE and PP. Yet even more preferably, the tile backing is selected from the group of a transmissive PVC layer, PVB layer, silicone rubber layer, PMMA layer, PE layer and PP layer. Recently there has been increased interest in new type of backings for carpet tiles, due to a growing demand for sustainable carpet backings, which means that the backing should be easy to recycle and should not harm the environment. It has been shown that it is now possible to make polyolefin backing systems, for example using PE (an example is EcoWorx by Shaw). The polyolefin backing may be very suitable for the current invention. In combination with a polyolefin backing, the invention provides an additional advantage over systems where LEDs are embedded in the carpet tile, because the lighting system can be easily separated from the carpet tile, making recycling easier.

Also the tile backing is preferably substantially free from light scattering or light absorbing fillers. However, in order to comply with standard for carpet tiles it may be necessary to use a filler. Also in these cases, light transmission can be improved using a filler with a similar index of refraction, and using a filler with improved purity. However, the number of suitable fillers is larger for the tile backing, because it does not have as strong fire retarding properties. Therefore transmissive materials such as glass, $Al_2O_3$, $TiO_2$, etc., may be used as filler materials (for example choosing the filler material while keeping the index of refraction in mind to prevent too much scattering).

In a specific embodiment of the carpet tile, the primary backing layer comprises polypropylene (or nylon or jute), the pre-coat layer comprises a material selected from the group consisting of light transmissive latex, light-transmissive acrylic and a light transmissive polyolefin dispersion based material, and the tile backing comprises a material selected from the group consisting of transmissive poly(vinyl chloride) (PVC), poly(vinyl butyral) (PVB), silicone rubber, poly (methyl methacrylate) (PMMA), polypropylene (PP) and polyethylene (PE). In this way, a carpet tile may be provided comprising one or more light transmissive carpet tile sections. Therefore, the invention also provides a carpet tile with the herein defined multi-layer structure, wherein the multi-layer carpet tile comprises a carpet tile light transmission in the range of preferably 0.5-30%, such as 0.5-15%, especially 1-10%, preferably at least 1%, for light propagating in a direction from the tile backing to the carpet tile top face and having a wavelength in the visible range. Thus, the term "section", may also refer to a plurality of sections.

In case a particulate filler material is used in the pre-coat layer and/or the tile backing, the ratio of the index of refraction of the filler material and the pre-coat layer or tile backing, respectively, is (are) preferably in the range of about 0.95-1.05.

Preferably, the primary backing layer is a light transmissive primary backing layer. The adhesive layer or pre-coat layer preferably is a light transmissive pre-coat layer. The tile backing preferably is a light transmissive tile backing (layer). In this way, a carpet tile may be provided that is light transmissive. The tile backing may be a "secondary backing", such as known in the art. The tile backing may be an adhesive layer. Note that the term "adhesive layer" herein refers to a layer that adheres (is attached) to another layer, here especially the pre-coat layer. During production, the tile is subjected to processes like curing and/or heating and/or drying, as known in the art, which leads to the formation of a layer which may provide strength and which has substantially no adhesive properties anymore, except for instance the adhesion of the pre-coat layer to the primary backing and the adhesion of the tile backing to the pre-coat layer.

The tile backing may further comprise a scrim. A scrim is a gauze (or mesh) material, such as jute, but may also be made of PP or nylon or fiber glass. Hence, the scrim preferably comprises a textile with a gauze structure (or mesh structure). The scrim may provide further strength to the carpet tile. An advantage of a mesh (or gauze) structures is that light from the light source may relatively easily be transmitted through the meshes (or gauzes). Another advantage is that the improvement in strength by the mesh can allow a further reduction of filler materials in the tile backing.

The type of materials, the specific composition of the materials, the (layer) thicknesses of the materials and the density, height, and color of the tufts may be chosen to provide a tile with the desired carpet tile light transmission. Preferably, the light transmissive carpet tile section has a carpet tile light transmission in the range of 0.5-30%, such as 1-15%. However, the light transmission may even be lower, such as in the range of about 0.5-10%, like 1-5%, or 0.5-5%. Preferably, the transmission is selected to prevent visibility of an object, such as the floor (or other elements like a light source or lighting system (in the switched off state)), by a viewer viewing the carpet top face of the carpet tile. Preferably, the transmission through the light transmissive carpet tile is at least 1%, such as at least 2%.

In a further aspect, the invention is also related to a carpet structure, especially a carpeted floor, comprising a plurality of light transmissive multi-layer carpet tiles as described herein. Such carpeted floor may be arranged on a transparent floor, like a glass floor. In this way, light may be provided from underneath the carpet tiles to the space where the carpeted floor is arranged.

Some embodiments of the invention are further elucidated with respect to carpeted floors as example of a carpet structure. However, the carpet structure may also be applied as ceiling carpet or wall carpet. Herein the term "carpeted floor" relates to a floor at least partially covered with a carpet, wherein the carpet comprises a plurality of carpet tiles. Therefore, the term "carpeted floor" refers to a floor at least partially covered with carpet tiles. The term "covered" does not exclude the presence of a light source, or a lighting system, or a padding between the floor and the carpet tile(s).

Examples are also tufted carpet tiles that are used as wall or roof covering. Herein, the "tufted carpet tiles" are also indicated as "carpet tiles".

BRIEF DESCRIPTION OF THE DRAWINGS

Embodiments of the invention will now be described, by way of example only, with reference to the accompanying schematic drawings in which corresponding reference symbols indicate corresponding parts, and in which.

DESCRIPTION OF PREFERRED EMBODIMENTS

Figure 1:
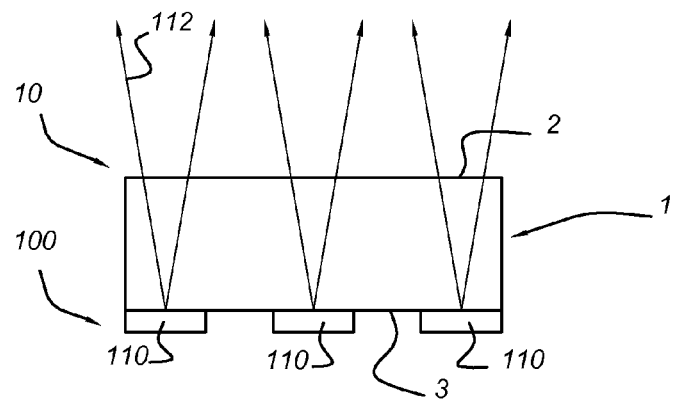
FIG. 1 schematically depicts an embodiment of a carpet structure comprising a carpet unit and, in this embodiment, a backlighting system.

FIG. 1 schematically depicts a carpet unit 1, such as a carpet, a carpet tile, or a plurality of carpet tiles. The carpet unit has carpet unit front face 2, on which people may for instance walk, and which is in general directed to the user(s) of the carpet unit 1, and a carpet unit back side 3.

By way of example, lighting units 110 are depicted, which are, in this schematically depicted embodiment, arranged at the back side 3 of the carpet unit 1.

An advantage of arranging the lighting units at the back side 3 is that the lighting units can be separate from the carpet unit. This allows the lighting units to be re-arranged and replaced at any time in future and this also reduces the cost for the total system, because no standardized carpet+lighting combination needs to be made. In the remainder of this description we will focus on a lighting unit placed at the back side of the carpet unit, and wherein the lighting unit is separate from the carpet unit. However, it should be taken into account that the lighting unit may also be integrated in the carpet unit as described earlier (for example where the lighting unit is embedded in the adhesive layer of the carpet unit). Each lighting unit 110 comprises at least one light source (see below). One or more lighting units 110 form together a back lighting system, which is indicated with reference 100.

In this schematically depicted embodiment, a variant is depicted, wherein the carpet unit 1 is transmissive for light 112 of the light source(s). Hence, light 112 may escape at the front face 2 from the carpet unit 1. Preferably, the lighting unit(s) 110 are not visible by a user viewing the front face 2. The combination of the carpet unit 1 and the back lighting system 100 is herein also indicated as carpet structure 10. The carpet structure 10 thus comprises a back lighting system and a carpet unit 1, wherein the back side 3 of the carpet unit 1 is adjacent to the lighting system 100 (more precisely, the lighting unit front faces, see below).

Figure 2A:
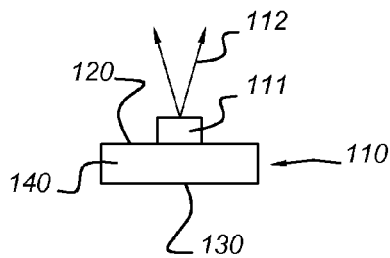
FIGS. 2a-2b schematically depict embodiments of a lighting unit (of a back lighting system)
Figure 2B:
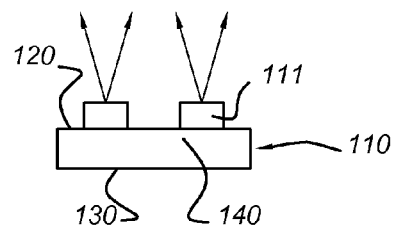
Figure 3A:
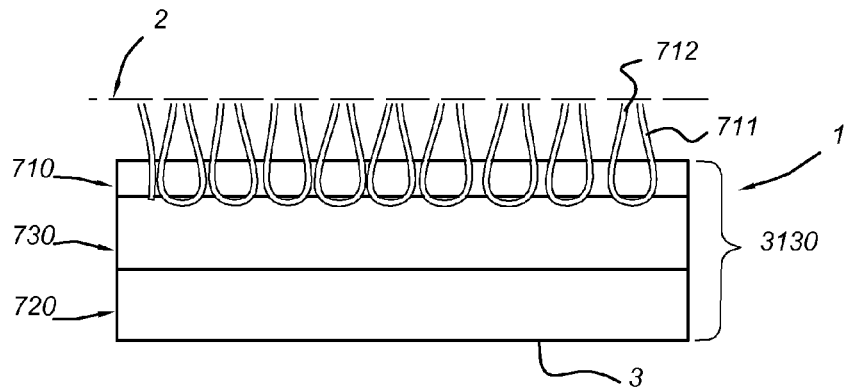
FIGS. 3a-3c schematically depict embodiments of carpet units.

FIGS. 2a-2b schematically depict embodiments of the lighting unit 110, wherein the lighting unit 110 comprises a substrate 140, at least one light source 111, arranged to generate light 112, a lighting unit front face 120, comprising the at least one light source 111, and a lighting unit back face 130. Preferably the total height is equal to or less than 3 mm, especially equal to or less than 1.5 mm. FIG. 3a schematically depicts an embodiment of the carpet unit 1, wherein the carpet unit comprises a laminate 3130. The carpet unit comprises a primary backing 710, comprising yarns 711 forming tufts 712. The yarns 711 extend from the primary backing layer 710, and the tufts 712 from the carpet unit front face 2. The laminate 3130 further comprises an adhesive layer 730. In general, the yarns 711 partly penetrate into the adhesive layer 730. The adhesive layer 730 is "sandwiched" between the primary backing 710 and a backing 720. The backing 720 may be a secondary backing of a carpet, or a carpet tile backing for a carpet tile. The backing 720 has an external face, which is indicated as carpet unit back side 3 (see also above).

Figure 3B:
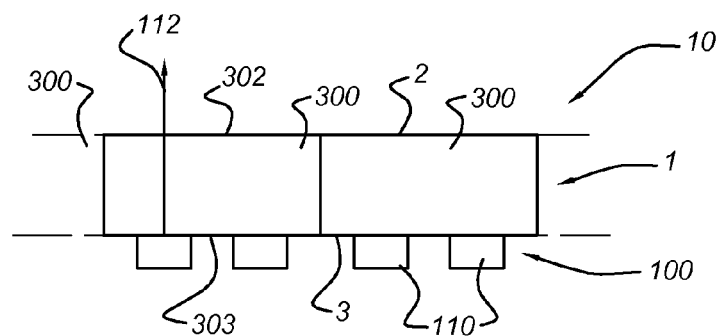
Figure 3C:
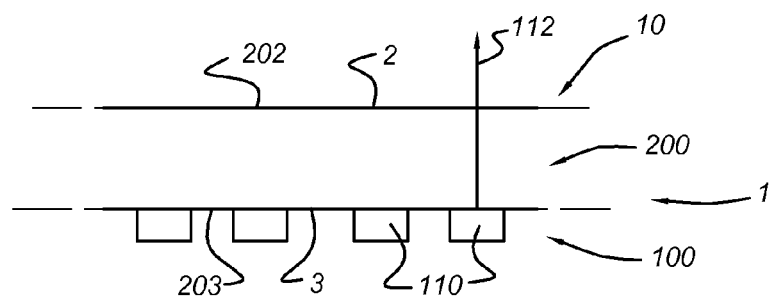

FIGS. 3b and 3c then schematically depict embodiments of carpet structures 10 comprising a plurality of carpet tiles 300 (3b) or comprising a ("broadloom") carpet 200 (3c), respectively. The front faces 2 and back sides 3 of the former are (also) indicated with references 302 and 303, respectively; the front face 2 and back side 3 of the latter are (also) indicated with references 202 and 203, respectively.

Figure 4A:
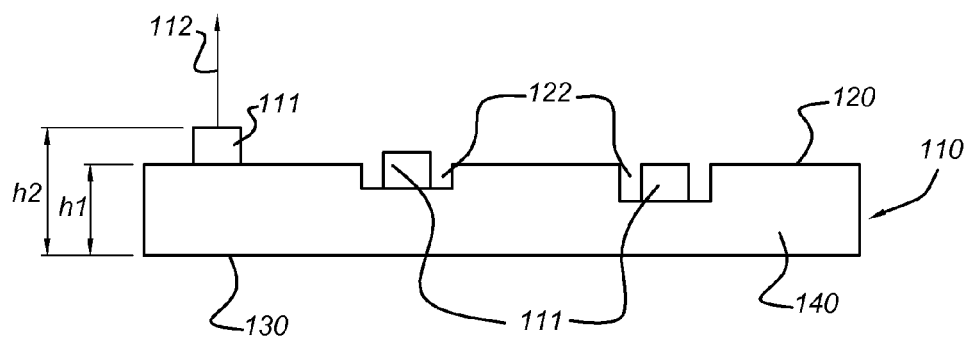
FIGS. 4a-4d schematically depict specific embodiments of lighting units of the back lighting system.
Figure 4B:
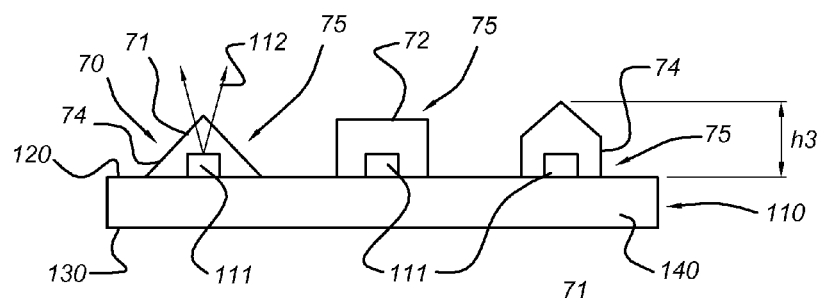
Figure 4C:
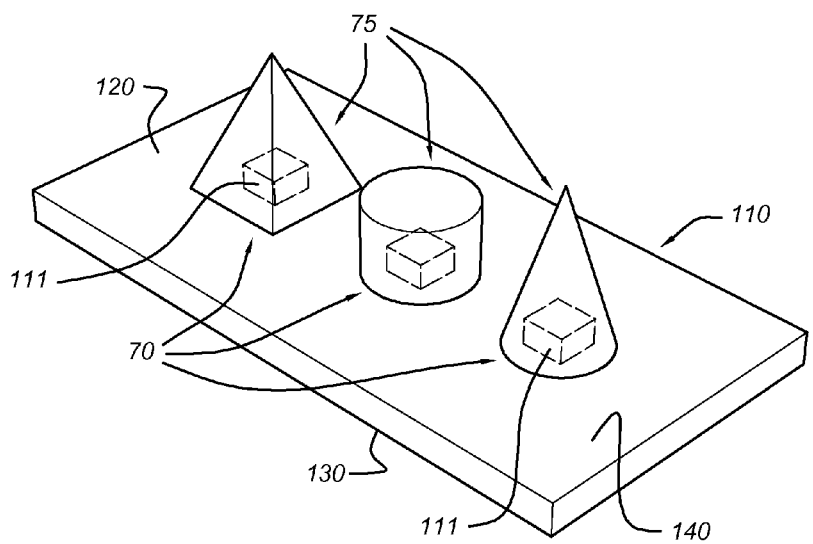

FIGS. 4a-4c schematically depict embodiments of the back lighting unit 110. In FIG. 4a, three variants are depicted of arrangements of the light source 111. In a variant (left), the light source 111 is arranged on the lighting unit front face 120; thereby, the lighting unit front face 120 comprises the light source 111. In other variants (middle/right), the lighting unit front face 120 comprises a substrate recess 122, wherein the light source 111 or accompanying electronics (such as one or more of a transistor, a mosfet, a diode, a resistance, a micro control unit chip, a capacitor, etc.) (not depicted) can be arranged. The light source 111 or electronics may partly (middle) or completely (right) sink in the substrate recess 122. The height of the substrate 140 is indicated with h1; the total height (including optional optics, see also below) of the back lighting unit 110 is indicated with h2.

FIGS. 4b-4c schematically depict in side-view and top view embodiments wherein the light sources 111 further comprise optics 70. The optics 70 are suitable to guide light 112 from the light source(s) 111 into the light transmissive carpet unit 1, and the optics 70 are suitable to penetrate into at least part of the light transmissive carpet unit 1 (see also below). The left and right variants in FIG. 4b has a sharp top face, indicated as pointed top face 71; the middle variant in FIG. 4b has a flat top face 72. Reference 74 indicates the external face of the optics 70. The optics 70 may comprise a structure 75 selected from the group consisting of pyramidal, cylindrical, conical, etc. FIG. 4c schematically depicts a top view of variants (not necessarily the same as depicted in FIG. 4b), wherein the left variant has a pyramidal shape, the middle variant a conical shape and the right variant a cylindrical shape. The height of the optics is indicated with reference h3.

The optics in 4c-4d may be equipped with a heating element that can melt the carpet unit to facilitate the penetration of the optics into the carpet unit. The heating element may be an electrically conductive element, such as a wire or a metal platelet, arranged at least part of an external face of the optics. When applying the carpet unit to the back lighting system, the heating element may be heated, preferably to a temperature in the range of 50-200° C. In this way, part of the backing layer may melt, thereby making it easier to penetrate the backing layer, accommodating at least part of the optics. For instance, in the conductive wire a current may be generated to heat the electrically conductive wire, and thereby heat the adjacent carpet unit parts. The current may be generated by connecting an (external) source to the electrically conductive element, and guiding a current through the electrically conductive element. In another embodiment, the current is generated by inductive coupling (this may be done using an induction source above the carpet).

Figure 4D:
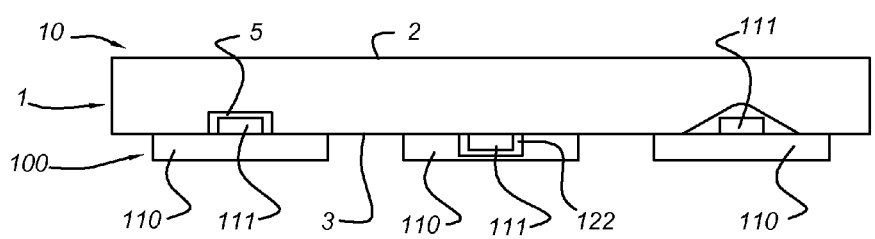

FIG. 4d schematically depicts an embodiment wherein the carpet unit 1 comprises a pre-formed or pre-shaped carpet unit recess 5 (left variant). The middle variant shows an embodiment of the lighting unit 110, wherein the light source 111 and/or optional electronics are sunk in the lighting unit recess 122, and in the right variant, it is shown that the back side 3 of the carpet unit 1 has adapted to the presence of the light source 111 (and optionally also lighting unit 110). Sharp optics 70 as shown above may be used to penetrate part of the backing layer, optionally even extending into the adhesive layer. The sharp optics 70 preferably do not penetrate into the primary backing layer.

Figure 5:
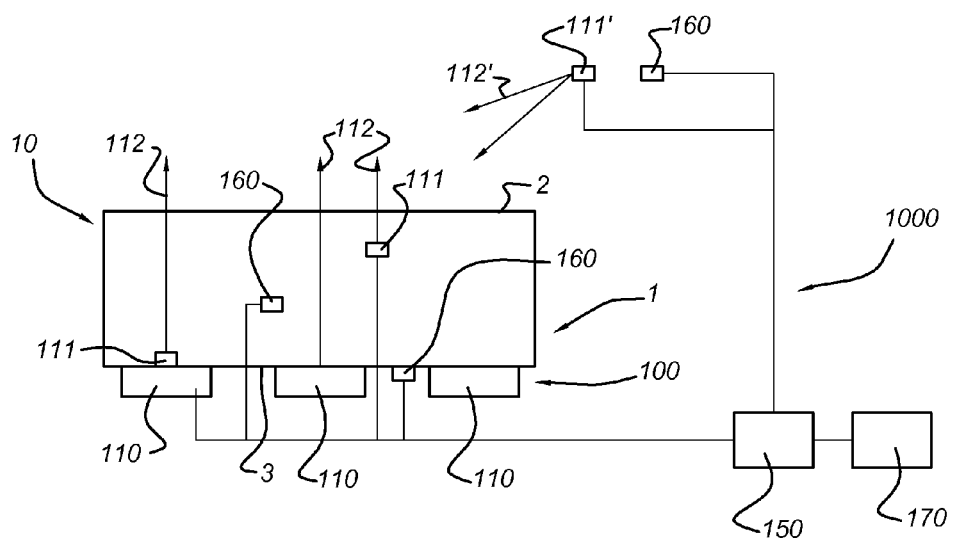
FIG. 5 schematically depicts a lighting arrangement, comprising a carpet unit, light sources (such as from a back lighting arrangement) and a control unit, and optional sensors.

FIG. 5 schematically depicts an embodiment of a lighting arrangement 1000 comprising a light source 111 (and/or 111') arranged to generate light 112, a control unit 150 and the carpet unit 1 as described herein. The control unit 150 is configured to receive one or more input signals and is configured to generate, in response to the one or more input signals, one or more output signals to control the light 112 (and/or 112') generated by the light sources 111 (and/or 111'), and wherein at least one input signal is received from the optical sensor 160. Note that the light source 111 may be part of the back lighting unit 110, or may be integrated in the carpet unit 1 but may in an embodiment (additionally or alternatively) also be external from the carpet unit 1; the latter variant is indicated with reference 111' and light 112'. Not that both options may be comprises by the arrangement 1000. Further, by way of example, an embodiment of the optical sensor 160 integrated in the carpet is depicted, an embodiment of the sensor 160 at the carpet unit back side 3 is depicted and an external sensor 160 is depicted. One or more of such sensors 160 may be applied. Input signals may be received from one or more of sensors 160 and/or may be received from a user input device 170. In the present invention, the lighting arrangement 1000 preferably comprises at least one light source 111 comprised by the carpet back lighting system 100.

Figure 6:
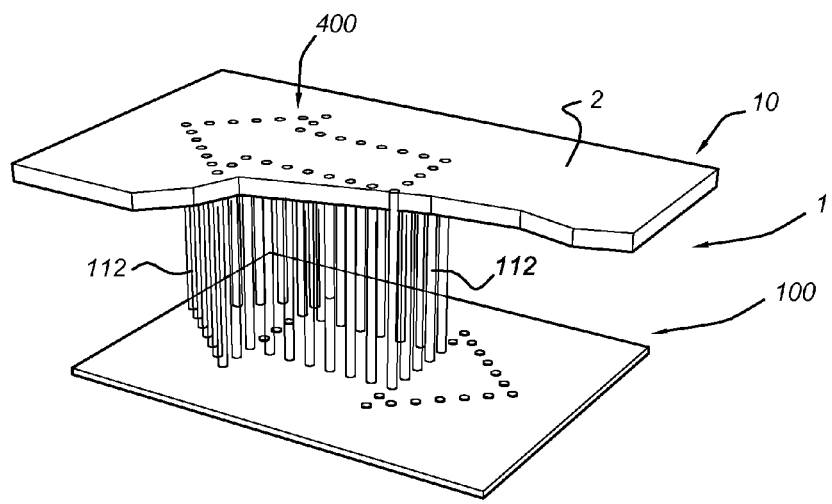
FIG. 6 schematically depicts a top view of a carpet unit showing arrows (as example of information)

FIG. 6 schematically depicts an example of the carpet unit 1, seen at the carpet unit top face 2, wherein light sources 111 are applied behind the carpet unit top face 2, such as in the back lighting system 100 and/or as sources embedded in the carpet unit 1. In this way, an embodiment of the carpet structure 10 is provided, which by way of examples shows information 400, in this example an arrow.

Figure 7A:
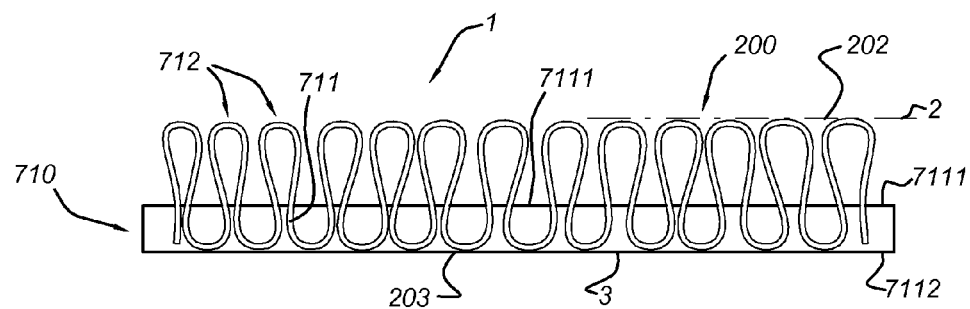
FIGS. 7a-7c schematically depict embodiments of the light emissive carpet.
Figure 7B:
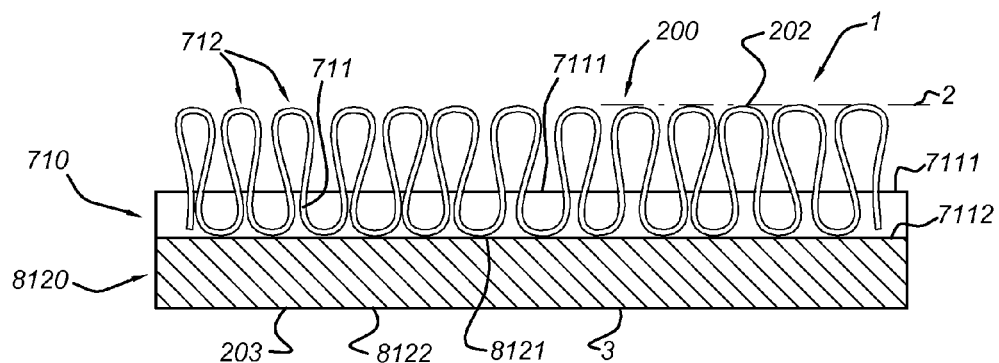
Figure 7C:
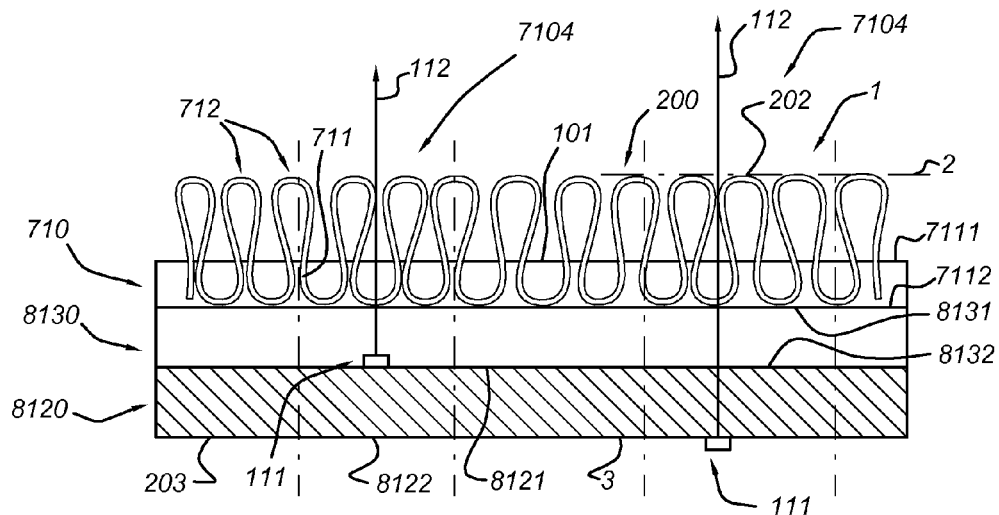

FIGS. 7a-7c schematically depict embodiments of a carpet 200 comprising a primary backing layer 710 (FIG. 7a), a primary backing layer 710 and a secondary backing layer 8120 (FIG. 7b), and a primary backing layer 710, an adhesive layer 8130 and a secondary backing layer 8120, respectively, wherein in the latter the adhesive layer 8130 is arranged between the primary backing layer 710 and the secondary backing layer 8120. The adhesive layer 8130 may also comprise domains (not depicted); i.e. the adhesive layer 8130 may be arranged between part(s) of the primary backing layer 710 and the secondary backing layer 8120. However, preferably the adhesive layer fully covers the area between the primary and secondary layer, such that adhesion is may be guaranteed over the entire surface of the carpet (this is important when cutting the carpet to a desired size The primary backing layer 710 has a primary backing layer top face 7111 and a primary backing layer bottom face 7112. The secondary backing layer 8120 has a secondary backing layer top face 8121 and a secondary backing bottom face 8122. The adhesive layer 8130 has an adhesive layer top face 8131 and an adhesive layer bottom face 8131. The carpet has a carpet unit front face 2, i.e. the carpet surface intended to walk, rest, sit, arrange objects, etc., on, and a carpet unit back side 2. The primary backing layer 710 and the optional secondary backing layer 8120 and the optional adhesive layer 8130 may form a stack or laminate of one or more layers, more precisely, form the carpet 200, having the carpet unit front face 2 and a carpet unit back side 2 as "boundaries".

In FIG. 7a, the carpet unit back side 2 substantially coincides with the primary backing layer bottom face 7112. In FIG. 7b, the primary backing layer bottom face 7112 is adjacent to the secondary backing layer top face 8121, and the carpet unit back side 2 substantially coincides with the secondary backing layer bottom face 8122. In FIG. 7c, the primary backing layer bottom face 7112 is adjacent to the adhesive top face 8131, the adhesive bottom face 302 is adjacent to the secondary backing layer top face 8121, and the carpet unit back side 2 substantially coincides with the secondary backing layer bottom face 8122. Note that the terms "bottom" and "top" are only used to elucidate in a clear way the different faces of objects such as of the primary backing layer, the adhesive layer (see below), the secondary backing layer and the laminate. The use of the terms "bottom" and "top" does not limit the carpet of the invention as claimed, neither its use, to the configurations schematically depicted in the accompanying drawings. The primary backing layer 710 is provided with yarns 711 forming tufts 712, here closed loop tufts, at the primary backing top face 7111. The carpet unit front face 2 is herein also indicated as "carpet side", or "side facing the user during its use as carpet".

Alternatively, in yet another embodiment, the carpet comprises a primary backing layer 710 and an adhesive layer, and no secondary backing layer 8120. This could the embodiment as schematically depicted in FIG. 7c, however without the secondary backing layer 8120, whereby thus the adhesive layer bottom face 8131 may coincide with the carpet unit back side (here thus carpet back face 203.

FIG. 7c by way of example also shows that the carpet 200 comprises at least one transmissive carpet section, indicated with reference 7104 (preferably the transmissive carpet section has the same size as the carpet (this may thus imply that whole the carpet 200 is transmissive)). A light source 111 is arranged below the carpet tile 300. The light source 111 is arranged to provide light 112, of which at least part may penetrate through the carpet 200. Light 112 downstream from the carpet 200 is (also) indicated with reference 112, which refers to "carpet light".

Therefore, the carpet 200 comprises the light transmissive carpet tile section 7104 having a light transmission, preferably in the range of 0.5-30%, for light 112 propagating in a direction from the tile backing 7120 to the carpet tile front face 302 and having a wavelength in the visible range.

FIGS. 8a-8d schematically depict embodiments of the carpet tile 300.

Figure 8A:
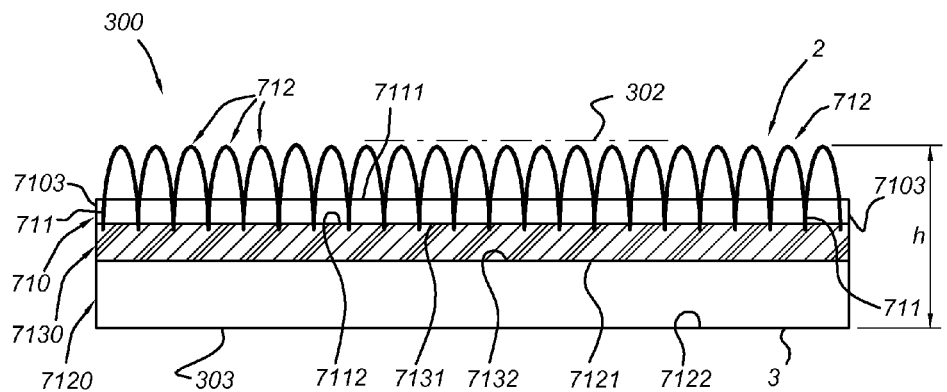
FIGS. 8a-8d schematically depict embodiments of the light emissive carpet tile.

FIG. 8a schematically depicts an embodiment of a light transmissive multi-layer carpet tile 300 having a carpet tile front face 302 and a carpet tile back face 303. The multi-layer carpet tile comprising a tufted primary backing layer 710 comprising the carpet tile front face 302 and a primary backing layer bottom face 7112. The carpet tile top face is the face or top of the carpet formed by the tufts, indicated with reference 712. The tufts 712 are made of yarns 711. The top face of the primary backing 710 is indicated with reference 7111. Through this top face 7111 of the primary backing layer 710, the yarns 712 protrude. The yarns 711 penetrate the primary backing layer 710 to form the tufts 712 projecting from the pile surface (i.e. the carpet tile front face 302) on which people can walk, etc.

The yarns 711 are normally loose and need to be adhered with adhesive (from an adhesive layer or pre-coat layer). The adhesive layer which may be present on the backside of the primary backing adheres the tufts to the primary backing layer and holds the tufts 712 in place. The carpet tile 300 (therefore) further comprises a pre-coat layer 7130, attached to the primary backing layer bottom face 7112. The pre-coat layer 7130 is coated to the primary backing layer bottom face 7112. In this way, the primary backing layer bottom face 7112 and the top face of the thus formed pre-coat layer 7130, indicated with reference 7131 are adjacent or interwoven (tied together).

The carpet tile 300 further comprises a tile backing 7120, attached to the pre-coat layer 7130. The tile backing 7120 comprises a tile backing top face 7121 and a tile backing bottom face 7122. The former is adjacent to the pre-coat layer bottom face 7132, since the tile backing substantially consists of an adhesive provided to the pre-coat layer bottom face 7132. The tile backing 7120 comprises the carpet tile back face 303. In this embodiment, the tile backing bottom face 7122 is the carpet tile back face 303.

The carpet tile 300 has a total height h. The edge(s) of the carpet tile 300 are indicated with reference 7103.

Figure 8B:
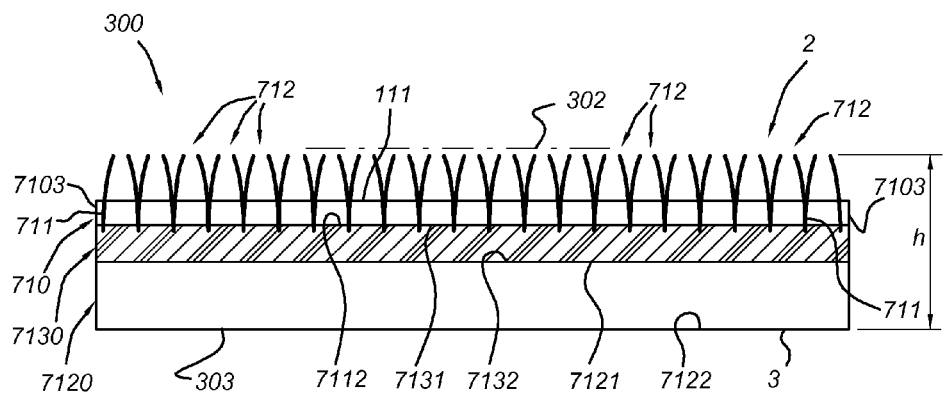

FIG. 8b is substantially the same as FIG. 8a, but by way of example cut-loop tufts 712 are schematically depicted, whereas in FIG. 8a loop tufts 712 are shown.

Figure 8C:
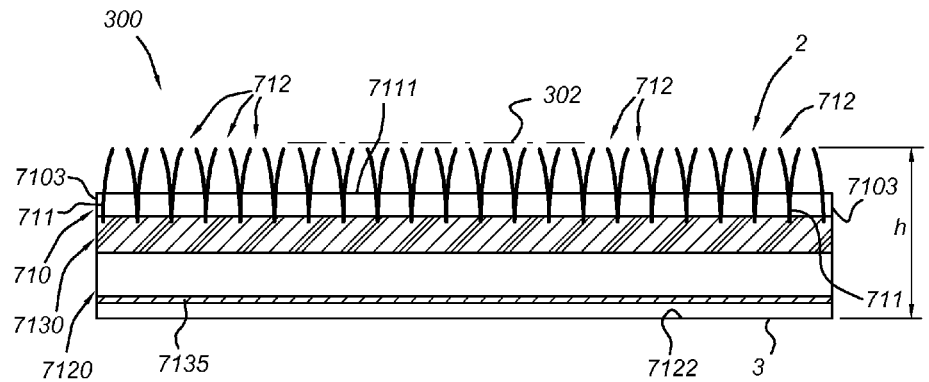

FIG. 8c schematically depicts an embodiment wherein the tile backing 7120 further comprises a scrim 7135, such as a jute mat. In general, the scrim will be embedded in the adhesive material of the tile backing 7120.

The carpet tile 300 may be produced by a method comprising (a) tufting fibers through a light transmissive primary backing (to form a pile), (b) applying a light-transmissive pre-coat adhesive coating to the primary backing layer bottom face 7112 of the primary backing 710 (thus opposite from the pile), which secures the facing fibers to the primary backing 710 and thereby providing the pre-coat layer 7130, (c) applying a light-transmissive backing adhesive to the backside of the pre-coat layer 7130, i.e. to the pre-coat layer bottom face 7132, and optionally the scrim 7135, thereby providing the tile backing 7120, and (d) cutting the carpet in carpet tiles of for example 0.5×0.5 m size.

A tufted carpet comprises in general a primary backing layer in which tufts are made, typically using nylon, wool, or polypropylene yarns. Subsequently a coating of an adhesive like latex is spread onto the bottom of the carpet in order to lock the tufts in place. This is called the pre-coat (latex) layer. The pre-coat layer 7130 provides strength to the tufts (so-called tuft bind strength). Further, the pre-coat layer 7130 is used to substantially prevent adhesive from the adhesive layer (see below) penetrate through (the openings between) the tufts in the direction of the carpet tile front face 302.

The pre-coat layer is preferably (as much as possible) free from a light scattering or light absorbing filler material such as calcium carbonate. However, fillers may be needed to achieve the required fire retarding properties. For these purposes fillers may be added, and preferably these fillers are chosen in a low amount and they are chosen with a refractive index as close as possible to the adhesive material. As examples of fire retarding materials, the pre-coat layer 7130 may comprise (in addition to the adhesive) one or more materials selected from the group consisting of aluminum trihydrate ($Al(OH)_3$(ATH)), magnesium oxide (MgO (MDH)), and zinc borate ($Zn(BO_3)_2$ (ZB)), antimony trioxide ($Sb_2O_3$ (AO)). In experiments, we have found that especially aluminum trihydrate has a good light transmittance when it is used in combination with latex, due to an acceptable match in the optical index of refraction.

After the pre-coat layer has dried, an additional layer of tile backing adhesive, like the materials mentioned before, is applied (to provide the so-called tile backing or tile backing layer), using methods that are known in the art (for example to apply a PVC backing). Optionally, the scrim 7135 (having a gauze structure) may be applied. Typically the scrim 7135 is applied onto the uncured tile backing layer, such that the scrim 7135 may sink into the tile backing adhesive. The purpose of the scrim 7135 is to give the carpet structure extra strength. The tile backing adhesive is subsequently cured (method depends on the type of tile backing material that is used). Thereafter, the carpet may be cut into carpet tiles 300. In this way, a multi-layer carpet tile 300 is provided.

The tile backing 7120 may thus be the above mentioned combination of tile backing adhesive layer 7130 and scrim 7135, but may also be the tile backing adhesive per se. Such scrim 7135 in general is embedded in the adhesive layer before curing/drying the adhesive layer to provide the tile backing 7120.

A difference between carpets and carpet tiles 300 is that the latter are more stiff or rigid. This is important, because otherwise the carpet tiles would not stay in its place when installed. Typical tile requirements are total mass per unit area (for example >3.5 kg/$m^2$ for a loose laid tile), dimensions (for example ±0.3% on nominal dimensions, ±0.2% in the same batch), squareness and straightness of edges (for example ±0.15% in both directions), dimensional stability (for example shrinkage and extension ≤0.2% in both directions), curling/doming (for example max deviation of any part of the sample from its plane ≤2 mm), and for example no damage at cut edge (fraying). Further, the dimensions of carpet tiles 300 are different from carpets. In general, a carpet tile 300 has a area of 1 m2 or less, but typically the area is 0.5 m×0.5 m=0.25 $m^2$. Carpet tiles 300 may further be defined as to comply with NEN-EN 1307 (ICS 59.080.60, June 1118), especially Annex A. Further, a common tuft bind strength test is ASTM D1335. Standards from UM44d are 6.25 pound for loop-pile and 3.0 pounds for cut-pile average.

With respect to the carpet tile 300, the packing density of the yarns, the color and length of the yarns, the type of the tile backing 7120, and the type of adhesive layer 7130, such as between the primary backing layer 710 and the tile backing 7120, can be selected to provide a carpet tile 300 that allows transmission of light of a light source 111 arranged below the carpet tile 300.

The carpet tile 300 is especially arranged to be at least partially transmissive. Herein the term "at least partially transmissive" indicates that at least one or more parts of the carpet tile 300 is (are) transmissive (i.e. especially light from one side of the carpet tile 300 (such as the bottom face (see below) of the carpet tile 300) can penetrate through the carpet tile 300, and reach the opposite side of the carpet tile 300 (such as the top face (see below) of the carpet tile 300). Such part is herein indicated as "transmissive carpet tile section", see for instance FIG. 2a. The term "section" is used to indicate that transmission may vary over the carpet tile 300. However, in case the there are no substantial inhomogeneities in the primary backing layer 710, the pre-coat layer 7130 and the tile backing 7120, respectively, the entire tile 300 may have the herein indicated transmission. When light is transmitted from the carpet tile back face 303 (see also below) to the carpet tile front face 302 (see also below), this may thus result in light being emitted from the tufted surface (i.e. from the carpet tile front face 302).

Therefore, the invention especially provides a light transmissive multi-layer carpet tile 300 having a carpet tile front face 302 and a carpet tile back face 303, the multi-layer carpet tile comprising (a) a tufted primary backing layer 710 comprising the carpet tile front face 302 and a primary backing layer bottom face 7112, (b) a pre-coat layer 7130, attached to the primary backing layer bottom face 7112; and (c) a tile backing 7120, attached to the pre-coat layer 7130, wherein the tile backing comprises the carpet tile back face 303; wherein the multi-layer carpet tile 300 has a carpet tile light transmission in the range of 0.5-30%, such as 1-15%, such as 1-10%, for light 112 propagating in a direction from the tile backing 7120 to the carpet tile front face 302 and having a wavelength in the visible range.

Figure 8D:
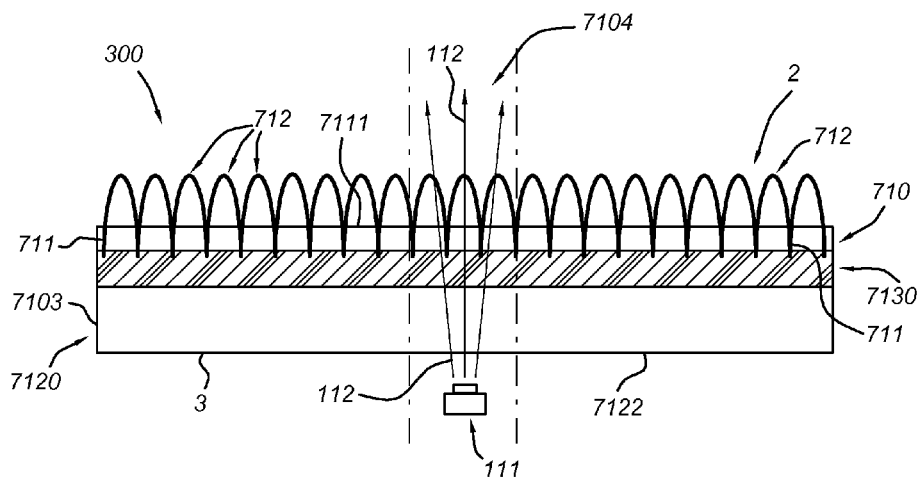

FIG. 8d schematically an embodiment of the carpet tile 300 with specific reference to the light transmissive properties. The carpet tile 300 comprises at least one transmissive carpet section, indicated with reference 7104 (preferably the transmissive carpet section has the same size as the carpet tile (this may thus imply that whole the carpet tile 300 is transmissive)). A light source 111 is arranged below the carpet tile 300. The light source 111 is arranged to provide light 112, of which at least part may penetrate through the carpet tile 300. Light 112 downstream from the carpet tile 300 is (also) indicated with reference 112, which refers to "carpet light".

Therefore, the multi-layer carpet tile 300 comprises the light transmissive carpet tile section 7104 having a carpet tile light transmission, preferably in the range of 0.5-30%, such as 0.5-15%, preferably at least 1%, for light 112 propagating in a direction from the tile backing 7120 to the carpet tile front face 302 and having a wavelength in the visible range.

The terms "light transmissive carpet tile section" and "carpet tile light transmission" are especially used to indicate that the light is transmitted through the multi-layer from tile backing 7120 to carpet unit front face 2. The phrase "having a wavelength in the visible range" indicates that at least at one wavelength within the visible wavelength range the transmissive carpet section 7104 of carpet tile 300 is transmissive for this wavelength. However, the transmissive carpet section 7104 is typically transmissive for a plurality of wavelengths, such as for a wavelength band.

Transmission is measured of light travelling through the tile backing 7120, or at least part of the tile backing 7120 in case a recess is present or the light source is embedded in the tile (see also below), through the pre-coat layer 7130, and through the tufted primary backing layer 710. The intensity of the light downstream of the carpet tile front face 302 is related to the intensity of the light upstream of the tile backing 7120. The light shed on the tile backing 7120 for determining transmission is preferably directed on the tile backing 7120 (or a recess therein) under normal incidence and the total integrated light emission on the other side of the carpet is measured.

According to a further embodiment of the invention, the adhesive layer (or pre-coat layer) 7130 comprises latex. The latex is especially light permeable latex. It is noted that the adhesive layer may substantially consist of latex. The latex may be based on terpolymers of styrene, butadiene and an acidic vinyl monomer. When the adhesive (or pre-coat layer) 7130 layer substantially consists of light permeable latex and comprise substantially no light scattering or absorbing particles, the light from the light source(s) may efficiently travel through the adhesive layer. Thus, preferably no light scattering or absorbing fillers are used in the adhesive (or pre-coat layer) 7130 and the adhesive layer (or pre-coat layer) 7130 is light permeable. Therefore, in an embodiment, the adhesive layer (or pre-coat layer) is free from light scattering or absorbing particles. The phrase "is free from . . . " and similar phrase or terms especially indicate that something "is substantially free from . . . ". If the pre-coat layer 7130 cannot be free from fillers (for example due to fire retarding properties of these particles), the amount of filler should preferably be reduced as much as possible. Alternatively, the filler could be replaced with another filler that does substantially not scatter light. This may be achieved by choosing a filler that has a similar optical index of refraction compared to the adhesive material.

According to a further embodiment of the invention, the adhesive layer (or pre-coat layer) 7130 comprises acrylics. The acrylics may be light permeable acrylics. It is noted that the adhesive layer (or pre-coat layer) 7130 may substantially consist of acrylics. An example of acrylics is polyacrylate ester. Advantages of acrylics are hardness. Acrylics are also highly resistant to heat, which makes it an especially suitable material for use in combination with LEDs, which generate a relatively large amount of heat. Latex and acrylics may also be used in combination.

In a preferred embodiment a polyolefin dispersion is used as pre-coat layer 7130. A suitable polyolefin dispersion may for instance be HYPOD™ of Dow Chemical. These are propylene- and ethylene-based dispersions that combine the performance of high-molecular-weight thermoplastics and elastomers with the application advantages of a high-solids waterborne dispersion. Polyolefin dispersions can provide benefits to carpet manufacturers by allowing them to apply a thermoplastic backing using conventional coating equipment. Example are for instance PVB (poly vinyl butyral), or polypropylene. Another suitable polyolefin dispersion may be a PVB-based dispersion. Therefore, in an embodiment, the adhesive layer (or pre-coat layer) preferably comprises one or more of an acrylic adhesive and a polyolefin dispersion adhesive.

The tile backing 7120 also comprises an adhesive, coated to the pre-coat layer 7130. This adhesive layer may optionally comprise the above mentioned scrim 7135. Preferably, the adhesive layer used for the tile backing 7120 comprises a material selected from the group consisting of transmissive PVC (poly vinyl chloride), PVB (poly vinyl butyral), silicone rubber, PMMA, PE and PP. Yet even more preferably, the tile backing 7120 is selected from the group of a transmissive PVC layer, PVB layer, silicone rubber layer, PMMA layer, PE layer and PP layer. Recently there has been increased interest in new type of backings for carpet tiles, due to a growing demand for sustainable carpet backings, which means that the backing should be easy to recycle and should not harm the environment. It has been shown that it is now possible to make polyolefin backing systems, for example using PE (an example is EcoWorx by Shaw). The polyolefin backing may be very suitable for the current invention. In combination with a polyolefin backing, the invention provides an additional advantage over systems where LEDs are embedded in the carpet tile, because the lighting system can be easily separated from the carpet tile, making recycling easier.

In a specific embodiment of the carpet tile 300, the primary backing layer 710 comprises a material selected from the group consisting of polypropylene, nylon and jute especially PP), the pre-coat layer 7130 comprises a material selected from the group consisting of a latex layer, an acrylic layer and a transmissive polyolefin dispersion based layer, and the tile backing 7120 comprises a material selected from the group consisting of transmissive PVC (poly vinyl chloride), PVB (poly vinyl butyral), silicone rubber, PMMA, PE and PP.

Figure 9A:
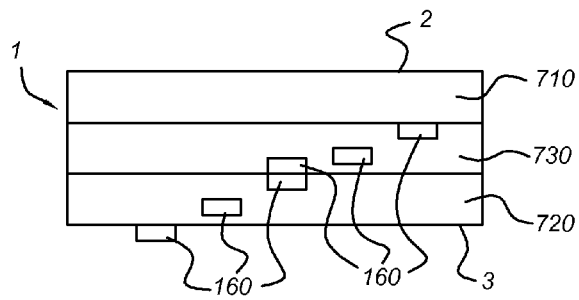
FIGS. 9a-9d schematically depict embodiments of the back lighting unit of the back lighting system and of the carpet unit.

FIGS. 9a-9d schematically depict embodiments of the optical sensor 160. In FIG. 9a, variants of arrangements of the optical sensor 160 are depicted. From left to right, the optical sensor 160 is arranged behind the carpet unit 1 (here in contact with the carpet unit back face 3), within the backing layer 720, within the backing layer 720 and adhesive layer 730, within the adhesive layer 730, and within the adhesive layer substantially in contact with the primary backing 710, respectively.

Figure 9B:
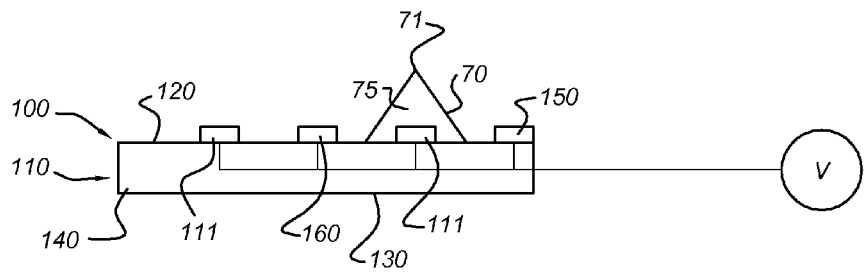
Figure 9C:
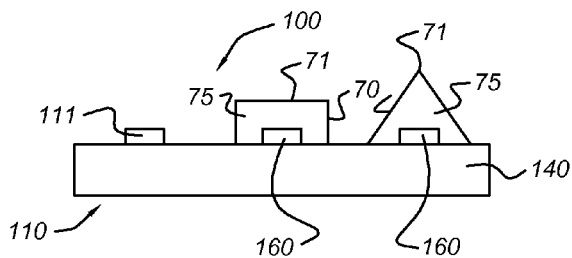

In a specific embodiment, the optical sensor 160 is integrated in a back lighting system 100 (see also above). FIG. 9b schematically depicts an embodiment, wherein the back lighting system 100 comprises, for illustration purposes, one back lighting unit 110, although the back lighting system 100 may of course comprise more than one back lighting units 110. In this example, the back lighting unit 110 comprises, from left to right, a light source 111, an optical sensor 160, a light source 111 provided with optics 70, and a control unit 150. FIG. 9c schematically depicts an embodiment wherein the optical sensor 160 is provided with optics 70.

The optics 70 may comprise a pyramidal or conical structure 75, having a pointed top face 71. The optics 70 penetrate into at least part of the carpet unit 1, here in at least part of the backing layer 720. This may be due to the fact that the carpet unit 1 comprises a pre-shaped recess and/or may be due to the fact that the optics were (at least partly) penetrated into the carpet unit 1. The optics 70 may also have a cuboidal (such as a cube) or cylindrical structure 75. Further, this optics 70 may comprise a heating element (not depicted).

Hence, optics 70, that may be used to penetrate into the carpet unit 1, may be applied to one or more of the optical sensor 160, the light source 111, the control unit 150, and also other accompanying electronics, such as mentioned above. Note that the control unit 150 may be part of a larger control unit. For the sake of clarity, the control unit is indicated with reference 150. The term control unit may thus refer to one single unit, or to a plurality of control units. In general, there may be one main control unit, with subordinated sub control units.

Figure 9D:
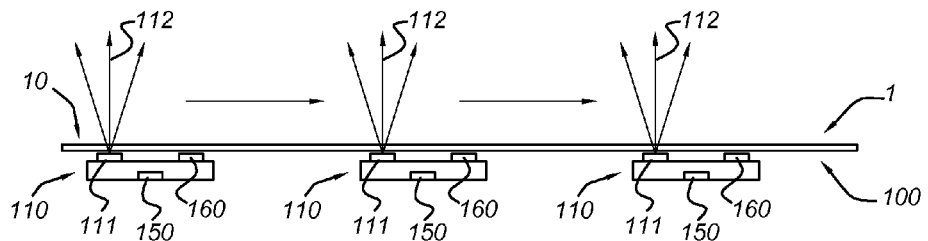

FIG. 9d schematically depicts an embodiment wherein the lighting system 100 comprises a plurality of lighting units 110, wherein each lighting unit comprises light source 111, control unit 150 and optical sensor 160. The back lighting units 110 are arranged to send and receive signals by light 112 from a first back lighting unit 110 to one or more other back lighting units 110. The signals by light may in an embodiment be coded light. In this way, back lighting units may transport information from one back lighting unit 110 to another back lighting unit 110. Each control unit 150 is configured to receive one or more input signals, of which at least one may be of the optical sensor 160, attached to the same back lighting unit as comprising the control unit 150, and is configured to generate, in response to the one or more input signals, one or more output signals, to control the light 112 generated by the light source 111, attached to the same back lighting unit as comprising the control unit 150. In the drawing, the horizontal errors by way of example indicate a travelling direction of information from the one back lighting unit 110 to the next. Instead of sending signals directly from one lighting unit 110 to the other, it is also possible that signals are send from a lighting unit 110 to a receiver unit placed separately from the carpet, and from the receiver unit to optionally another receiver unit, and eventually from a receiver unit to a second lighting unit 110. The receiver units therefore also comprise a light source 111 and optical sensor 160 and control unit 160.

The invention thus also provides a carpet structure 10, such as depicted in FIG. 1 and a lighting arrangement 1000 such as depicted in FIG. 5, comprising the back lighting system 100, including one or more optical sensors 160, as described above. The invention also provides a carpeted floor, comprising the carpet structure 10.

In an embodiment the optical sensor 160 is located below (i.e. behind) the carpet unit 1, preferably opposite from an external light source such as the external light source 111' schematically depicted in FIG. 5. The carpet unit 1 is made light-transmissive using for instance a light transmissive carpet adhesive layer 730 between the primary backing layer 710 and backing layer 720, and using a light transmissive primary backing 710 and backing layer 730 (for example a standard polypropylene primary backing and an ActionBak secondary backing are suited for this). The adhesive layer 730 may for instance comprise a light transmissive latex adhesive or a light transmissive acrylic adhesive.

In a further embodiment, the sensor is incorporated in a back lighting system suitable for placing under a light-transmissive carpet. This may for example be a spotlight, a strip light, or a video panel modified to fit in an undeep recess (for example between 4-15 mm).

As mentioned above already, the optical sensor may be used for many applications. Below, some (further) examples are given. In one example the optical sensor is used to detect the presence of persons, animals or items on the floor. This is achieved by monitoring the light intensity on the sensor. When the light intensity suddenly drops, this indicates that there is a presence above the sensor, blocking the light from for example a light source 111' as shown in FIG. 5. The detection of a presence may be used to trigger for example one or more light sources (such light sources may be arranged in one or more of the back lighting system or external from the carpet, such as on a wall or on at a ceiling) to turn off or turn on or change intensity or change color, etc. For example, the lighting sources may be instructed to display information in the floor, or may be used to increase the amount of illumination.

In one example the optical sensor is used to detect the presence of a person on the steps of a stair, using one or more optical sensors within the step. When the person is detected, light source(s) will turn on in order to create an illuminated step. Here, the light source(s) may be part of a back lighting system or may be arranged external, or both options may be applied.

In another example the optical sensor is used to detect the on/off state of other lighting systems in a room. For example, the back lighting system below the carpet may use information regarding ambient light intensity in order to choose an appropriate light intensity for the back lighting system. This is an advantage, because otherwise the light intensity of the back lighting system may be too low to be observable in a high ambient intensity, or the intensity of the back lighting system may be too high, causing irritation, a blinding effect, or a loss of night-vision to people looking at the carpet unit, such as a carpet or plurality of carpet tiles. This embodiment may also be used to adapt the output light intensity independently for every light source/optical sensor combination in back lighting units comprising a light source, a control unit and a optical sensor.

In another example the optical sensor is used to detect light from the lighting system that is also below the carpet (detecting the light that reflected from the carpet). This may be used to monitor the light output of the lighting system, such that the output intensity may be adapted accordingly. In a further embodiment the optical sensor is used to detect an information signal that is encoded within visible light. This is an advantage, because it is not straightforward how to send information to a light source located below a carpet. Since the carpet is light transmissive, the use of coded light becomes a possibility. In return, the light source below the carpet may return an information signal in coded light. This may for example be used to setup a network of lighting systems that are located below a carpet surface.

Although various aspects of the invention are set out in the accompanying independent claims, other aspects of the invention may include any combination of features from the described embodiments and/or variants and/or the accompanying dependent claims with the features of the independent claims, and not solely the combinations explicitly set out in the accompanying claims.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A carpet unit (1) comprising:
   a laminate of a tufted primary backing layer (710) providing a carpet unit top face (120), an intermediate adhesive layer (730), and a backing layer (720) providing a carpet unit back face (3), and
   an optical sensor (160) arranged to generate a sensor signal,
   wherein the optical sensor (160) is, seen from the carpet unit top face (120), arranged behind the primary backing layer (710), and wherein the carpet unit (1) is arranged to transmit light (113) from the carpet unit top face (120) to the optical sensor (160).

2. The carpet unit (1) according to claim 1, wherein the optical sensor (160) is embedded in one or more of the intermediate adhesive layer (730) and the backing layer (720).

3. The carpet unit (1) according to claim 1, wherein the optical sensor (160) is, seen from carpet unit top face (120), arranged behind the carpet unit back face (3).

4. The carpet unit (1) according to claim 1, wherein the adhesive layer (730) comprises a light transmissive latex adhesive or a light transmissive acrylic adhesive.

5. A lighting arrangement (1000) comprising a light source (111) arranged to generate light (112), a control unit (150), and the carpet unit (1) according to claim 1, wherein the control unit (150) is configured to receive an input signal from the optical sensor (160), and to generate an output signal in response to the input signal to control the light (112) generated by the light source (111).

6. The lighting arrangement (1000) according to claim 5, wherein the optical sensor (160) is arranged to sense people, and to generate a corresponding sensor signal.

7. The lighting arrangement (1000) according to claim 5, wherein the optical sensor (160) is arranged to sense an encoded light signal, and to generate a corresponding sensor signal.

8. The lighting arrangement (1000) according to claim 5, wherein the control unit (150) is arranged to derive from the sensor signal a position of a person, and to control, in dependence of the position of the person, the light (112) generated by the light source (111) to be in the form of a lighting pattern indicative of a direction for the person.

9. The lighting arrangement (1000) according to claim 5, wherein the control unit (150) is further arranged to derive from the sensor signal a direction of movement of a person, and to control, in dependence of the direction of movement of the person, the light (112) generated by the light source (111).

10. A use of the carpet unit (1) according to claim 1 in combination with a light source (111), or the lighting arrangement (1000) according to any one of claims 5-9, wherein the optical sensor (160) is arranged to sense a presence or a movement of a person, for anti-stumble lighting.

11. A use of the carpet unit (1) according to claim 1 in combination with a light source (111), or the lighting arrangement (1000) according to any one of claims 5-9, as one or more selected from the group consisting of a personalized in-building navigation system, a dating carpet unit, a carpet unit for showing lighted foot traces, a carpet unit responsive to sound, a carpet unit for showing the presence of a person or item on that carpet unit, a retail wayfinding carpet unit, a seat finder carpet unit, an advertisement carpet unit, a dynamic cue carpet unit, a game carpet unit, emergency exit indicator carpet unit, and a weight scale carpet unit.

* * * * *